(12) United States Patent
Allred et al.

(10) Patent No.: US 8,788,691 B1
(45) Date of Patent: Jul. 22, 2014

(54) METHOD AND APPARATUS FOR A CLIENT CONNECTION MANAGER

(75) Inventors: Curtis M. Allred, Cupertino, CA (US); Elliot Schwartz, Sunnyvale, CA (US)

(73) Assignee: Digi International Inc., Minnetonka, MN (US)

( * ) Notice: Subject to any disclaimer, the term of this patent is extended or adjusted under 35 U.S.C. 154(b) by 2538 days.

(21) Appl. No.: 11/558,904

(22) Filed: Nov. 11, 2006

Related U.S. Application Data

(63) Continuation of application No. 10/222,076, filed on Aug. 15, 2002, now Pat. No. 7,152,111.

(51) Int. Cl.
*G06F 15/16* (2006.01)
*G06F 15/173* (2006.01)

(52) U.S. Cl.
USPC .......................................... 709/231; 709/223

(58) Field of Classification Search
USPC ................................. 709/231, 223
See application file for complete search history.

(56) References Cited

U.S. PATENT DOCUMENTS

| | | | |
|---|---|---|---|
| 4,763,317 A | 8/1988 | Lehman et al. | |
| 5,553,239 A | 9/1996 | Heath et al. | |
| 5,867,661 A | 2/1999 | Bittinger et al. | |
| 6,233,582 B1 * | 5/2001 | Traversat et al. | 709/219 |
| 6,338,117 B1 | 1/2002 | Challenger et al. | |
| 6,490,614 B1 | 12/2002 | Shaffer et al. | |
| 6,529,301 B1 | 3/2003 | Wang | |
| 6,629,132 B1 * | 9/2003 | Ganguly et al. | 709/213 |
| 2002/0055980 A1 * | 5/2002 | Goddard | 709/217 |
| 2002/0087224 A1 * | 7/2002 | Barile | 709/200 |
| 2002/0087698 A1 | 7/2002 | Wilson | |
| 2002/0095506 A1 | 7/2002 | Tanimoto | |
| 2002/0098840 A1 | 7/2002 | Hanson et al. | |
| 2002/0120743 A1 * | 8/2002 | Shabtay et al. | 709/226 |
| 2002/0171676 A1 * | 11/2002 | Yampel et al. | 345/733 |
| 2003/0140123 A1 | 7/2003 | Master et al. | |
| 2004/0010596 A1 * | 1/2004 | Hui | 709/228 |

FOREIGN PATENT DOCUMENTS

| | | |
|---|---|---|
| EP | 1 126 675 A2 | 8/2001 |
| WO | WO 00/38375 A1 | 6/2000 |

OTHER PUBLICATIONS

RFC 793 Transmission Control Protocol, Sep. 1981, DARPA.*
Snoeren, Alex C. et al., Fine-Grained Failover Using Connection Migration, MIT Laboratory for Computer Science, Tech Report 812, Sep. 2000 Cambridge, MA, pp. 1-21. <http://nms.lcs.mit.edu/papers/migrate-failover/index.html>.

* cited by examiner

*Primary Examiner* — Aaron Strange
(74) *Attorney, Agent, or Firm* — Heimlich Law, PC; Alan Heimlich, Esq.

(57) ABSTRACT

A method and apparatus for a connection manager have been disclosed. By providing for persistent connections with clients, the connection manager allows for servers to communicate with clients, which would otherwise be inaccessible.

2 Claims, 23 Drawing Sheets

METHOD AND APPARATUS FOR A CLIENT CONNECTION MANAGER

RELATED APPLICATION

The present application for patent is a continuation of U.S. patent application Ser. No. 10/222,076 titled "METHOD AND APPARATUS FOR A CLIENT CONNECTION MANAGER" filed Aug. 15, 2002, some claims of which issued Dec. 16, 2009 as U.S. Pat. No. 7,152,111, and both the application and the issued patent are hereby incorporated herein by reference.

FIELD OF THE INVENTION

The present invention pertains to clients connected to a network. More particularly, the present invention relates to a connection manager for handling clients connected to a network.

BACKGROUND OF THE INVENTION

Connecting clients to servers presents challenges when the client is behind a firewall or router. A common scenario is as illustrated in FIG. 3. Here, a variety of clients 302-1 through 302-C are located in a house 301 and are connected to a firewall 304. Connections 306 are needed between the firewall 304 and the server 308. The firewall 304 may also be another device that protects and/or limits communication. For example, the firewall may be a gateway, a Network Address Translation (NAT) apparatus, etc.

A common situation arises as follows. A service provider has a server on the Internet, and a user has a client on a local LAN (Local Area Network) that is intended to work with the server. However, the LAN and the Internet are separated by a firewall. The LAN may be, for example, either a corporate LAN, a home network, etc. The firewall is often used to provide protection (especially in the case of a corporate LAN) between external and internal resources but sometimes it may be present as part of a NAT (Network Address Translation) to provide additional IP (Internet Protocol) addresses on the LAN. In many cases, a user will want the client and the server to communicate with each other without modifying the firewall, either because the firewall is not within their control (it may be run by the information systems department or the Internet service provider) or because they don't know how or don't want to go through the trouble of modifying the firewall.

Many Internet-based services require server-initiated transactions. For example, if a user has a network-enabled security system and wants to check on the status of the system while on vacation, the security service's server must initiate a transaction with, for example, a motion sensor to query the status. Before a transaction can be initiated, there must be a network connection between the client and the server. However, if there is a firewall or NAT router between the client and the server, the server may not be able to initiate a connection to the client because it will be blocked by the firewall/NAT. Firewalls attempt to make it impossible for unauthorized connections from the outside (i.e. Internet) to clients behind the firewall to occur while NATs exhibit this behavior as a side-effect. However, firewalls and NATs, relatively freely allow connections from the inside out to the Internet.

Therefore, one possible solution for server-initiated transactions is to first establish a persistent network connection from the client to the server. With a persistent connection between the client and the server, the server can initiate transactions whenever necessary, and the client can also initiate transactions over the same connection. The client initiates the connection, since it can initiate network connections out to the server relatively easily. The client may connect to the server upon, for example, powering on, and maintain the connection indefinitely, or establish a connection on a prescribed schedule. If a connection is dropped by intervening routers, etc., the client may attempt to reestablish the connection.

This scheme may work fine for a small numbers of clients. However, for a large number (i.e. thousands or more) of clients connecting to a single server, the server will soon be overloaded by the large number of simultaneous connections, even if none are actively engaged in transactions. Industry-standard servers do not handle persistent connections well because each connection uses resources, and only a limited number of connections can be maintained simultaneously. In a typical Operating System (such as Solaris, Linux, Windows) the TCP/IP (Transmission Control Protocol/Internet Protocol) implementation is designed such that when a connection is established, a significant amount of system memory is allocated for data buffers and structures to keep track of the state of the connection. As the data structures grow, more computing time is needed to service each connection when it is active. Application level connections such as HTTP (Hypertext Transfer Protocol) carry similar (additional) burdens. If a server is attempting to manage a large number of connections, it is soon overwhelmed with the overhead of simply managing the connections. This presents a problem.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
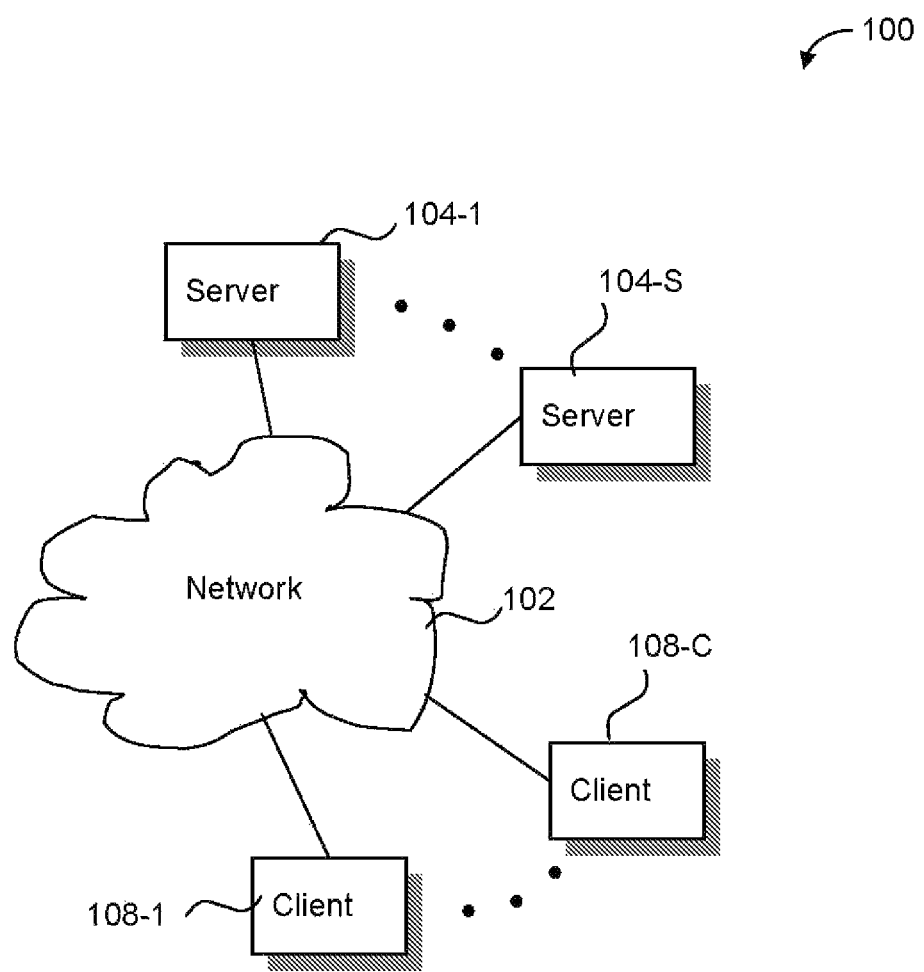
FIG. 1 illustrates a network environment in which the method and apparatus of the present invention may be implemented.

A method and apparatus for a client connection manager are described.

The present invention, by providing for persistent connections to clients, allows for server interaction and communication with clients that otherwise may not be accessible.

In the explanation below various terminology is used. These are understood by those skilled in the art. For the benefit of the reader the following should be noted. To provide a concise illustration of the present invention the context of the description will often refer to connecting Internet based services to network-enabled devices (i.e. clients). One skilled in the art will appreciate that the Internet is but one example of a network and that the present invention may be practiced with other networks. From a terminology perspective please note the following. A Service may be offered via a Server. The terms "device" and "client" are used interchangeably, A Transaction is an application level exchange between a client and a server. A transaction may be initiated by either the client or the server. A Connection is a network level connection, such as a TCP socket, an HTTP connection, or other bi-directional connection and may have a lifetime greater than a transaction.

Reference is made to tearing down a connection. Tearing down a connection is a term of art, which refers to removing a communication channel between communicating units (for example, a client and a server). Tearing down a connection does not necessarily imply also removing or disconnecting the clients. For example, a connection may be established between a server and a connection manager, another connection may be made between the connection manager and a client. The connection manager may also establish a connection between the server and the client. Now, tearing down the client to server connection does not imply that the client-to-connection manager or server-to-connection manager connections are torn down.

As noted above, if a server is attempting to manage a large number of connections, it is soon overwhelmed with the overhead of simply managing the connections. What is needed, and the present invention discloses, is a connection management scheme and apparatus designed specifically for device servers. A device server may be characterized as a large number of simultaneous connections, however, only a small number may be active at any one time. The present invention, a Client Connection Manager is able to support a large number of persistent connections.

In one embodiment of the present invention, a specialized TCP/IP stack replaces the standard TCP/IP stack on the server and allows the server to maintain many more connections without overloading the server.

In yet another embodiment of the present invention, a separate machine (such as a connection manager) intervenes between the clients and the server. This new machine runs the specially designed TCP/IP stack, which maintains the many client connections and only forwards the application level transactions to the server.

Figure 4:
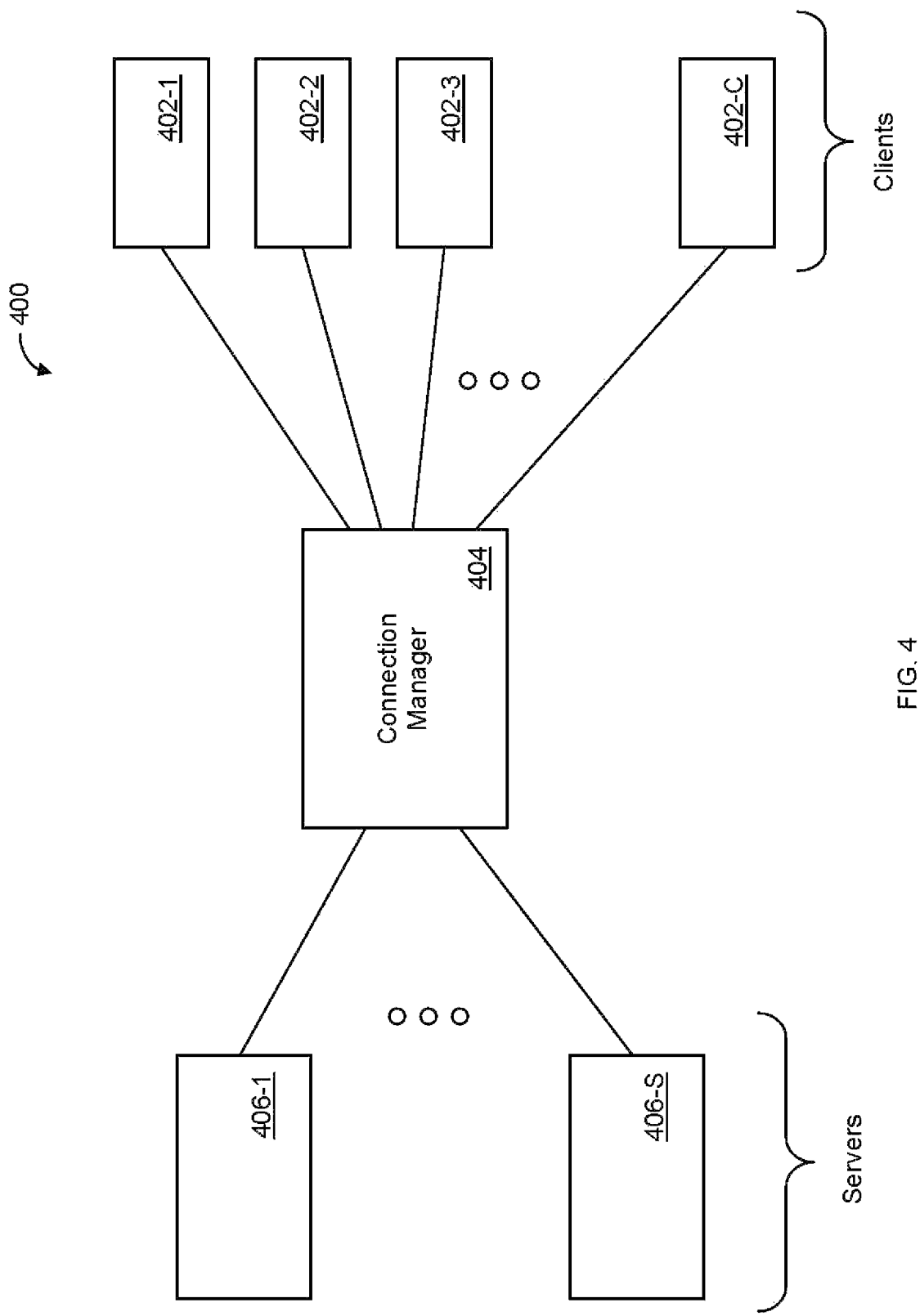
FIG. 4 illustrates one embodiment of a connection manager.

FIG. 4 illustrates one embodiment 400 of a connection manager 404 connected to clients 402-1 through 402-C and to servers 406-1 through 406-S. In operation the clients (402-1 through 402-C) request connection with a server (406-1 through 406-S). The connection manager 404 establishes a connection with the client, establishes a connection with the requested server, and then establishes the client to server connection. When the client to server connection is no longer needed, the connection manager 404 tears down the server connection, however it maintains the client to connection manager connection. In this way, if a server needs to access the client, the connection manager already has a connection to the client. Thus, if server 406-1 needs to communicate with client 402-2, the server 406-1 communicates with the connection manager 404 to establish a connection with client 402-2. The connection manager 404 would accept connection with the server 406-1, and then establish a server to client connection to client 402-2 since it already has a connection manager 404 to client 402-2 connection. When the server 406-1 to client 402-2 connection is no longer needed, the connection manager 404 will tear down the server to client connection. The connection manager will maintain the client connection and may or may not maintain the server connection.

Whether to maintain or tear down a connection may be based, in one embodiment, on activity on the connection. For example, if the client is a music player and the server is providing a music file, the connection may be torn down after the transaction of transferring the file(s) is completed. In another embodiment, the client may communicate to the connection manager information on when to tear down the connection. For example, the client may be a digital camera uploading pictures to a server. The camera may instruct the connection manager when the transfer is complete, and the connection manager may then tear down the client to server connection. The client commands to the connection manager on how to manage the client to server connection may not need to be sent to the server. That is, they are commands only intended for the connection manager. To be compatible with an environment in which a connection manager may not be present, the connection manager commands, if received by the server may be ignored.

Figure 5:
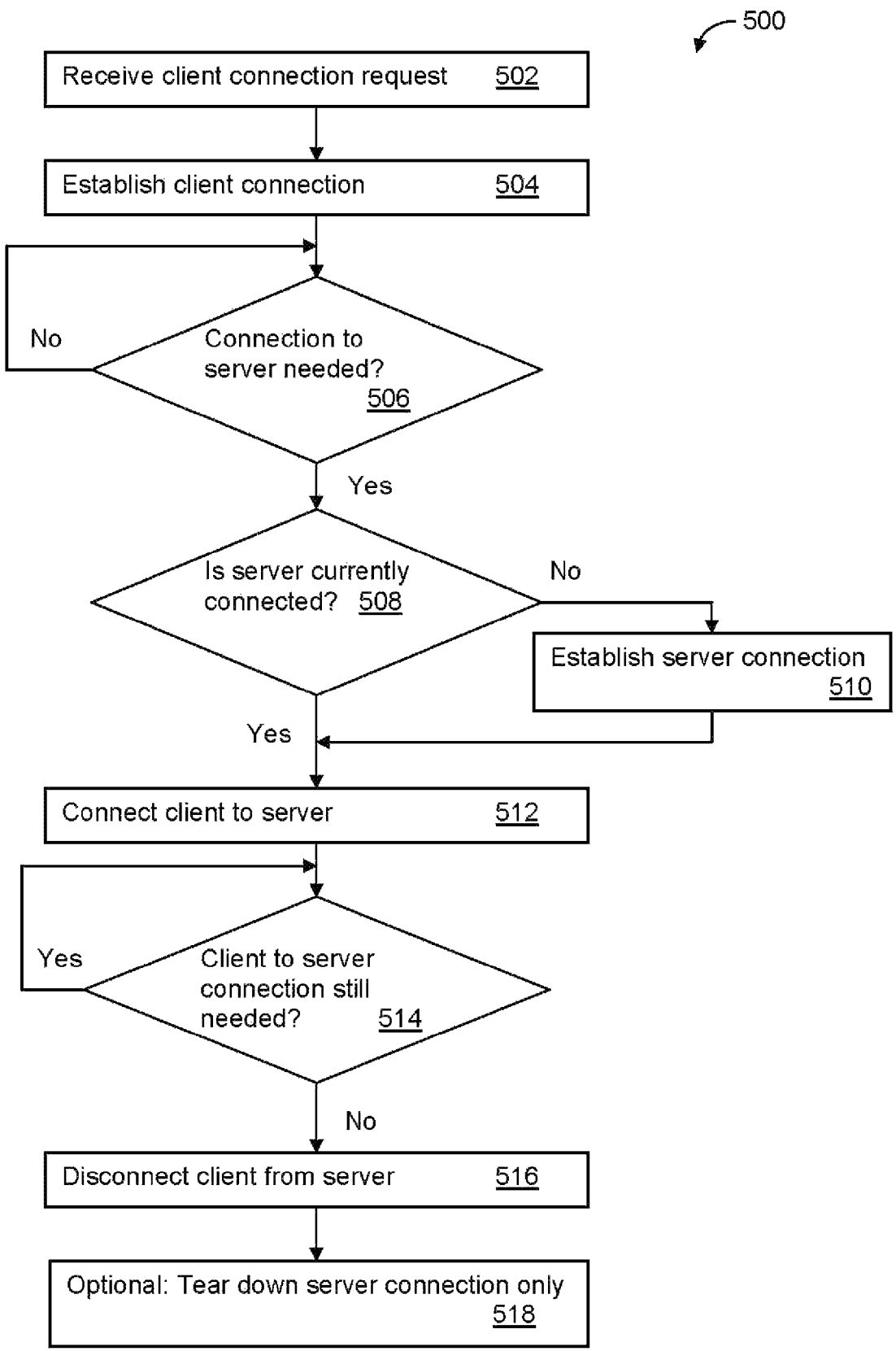
FIG. 5 is a flowchart illustrating one embodiment of client interaction with a connection manager.

FIG. 5 is a flowchart illustrating one embodiment of client interaction with a connection manager. At 502 the connection manager (CM) receives a client connection request. At 504 the CM establishes a connection with the client. At 506 it is determined if a connection to a server is needed. If no connection to a server is needed, then there is a loop back to 506 to check again. If a connection to a server is needed, then at 508 a check is made to determine if the server is currently connected to the connection manager. If the server is not currently connected to the CM then at 510, the CM establishes a CM to server connection and then proceeds to 512. If the server is currently connected to the CM (either via 508 or 510) then the CM connects the client to the server at 512. At 514 a check is made to determine if the connection is still needed. If the connection is still needed, then loop back to 514 to check again. If the client to server connection is no longer needed, then at 516 the connection manager disconnects the client from the server. Optionally at 518 the connection manager may tear down the connection manager to server connection.

Figure 6:
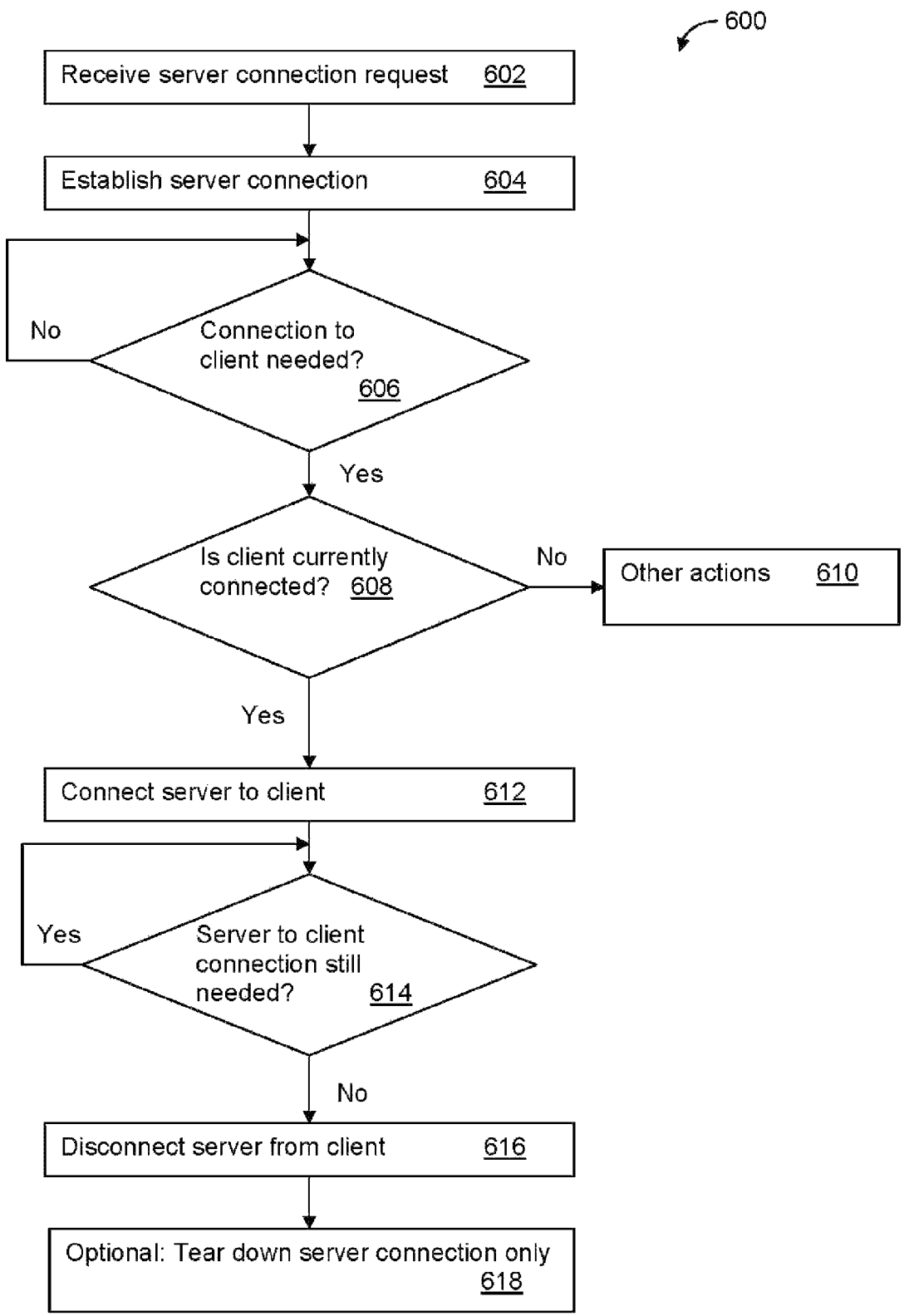
FIG. 6 is a flowchart illustrating one embodiment of server interaction with a connection manager.

FIG. 6 is a flowchart illustrating one embodiment of server interaction with a connection manager. At 602 the connection manager (CM) receives a server connection request. At 604 the CM establishes a connection with the server. At 606 it is determined if a connection to a client is needed. If no connection to a client is needed, then there is a loop back to 606 to check again. If a connection to a client is needed, then at 608 a check is made to determine if the server is currently connected to the connection manager. If the server is not currently connected to the connection manager then at 610 some other action may be taken. For example, the connection manager may wait until the client is connected, or it may refuse the server connection, etc. lithe client is currently connected to the connection manager then the connection manager connects the server to the client at 612. At 614 a check is made to determine if the connection is still needed. If the connection is still needed, then loop back to 614 to check again. If the server to client connection is no longer needed, then at 616 the connection manager disconnects the server from the client. Optionally at 618 the connection manager may tear down the connection manager to server connection.

Figure 7:
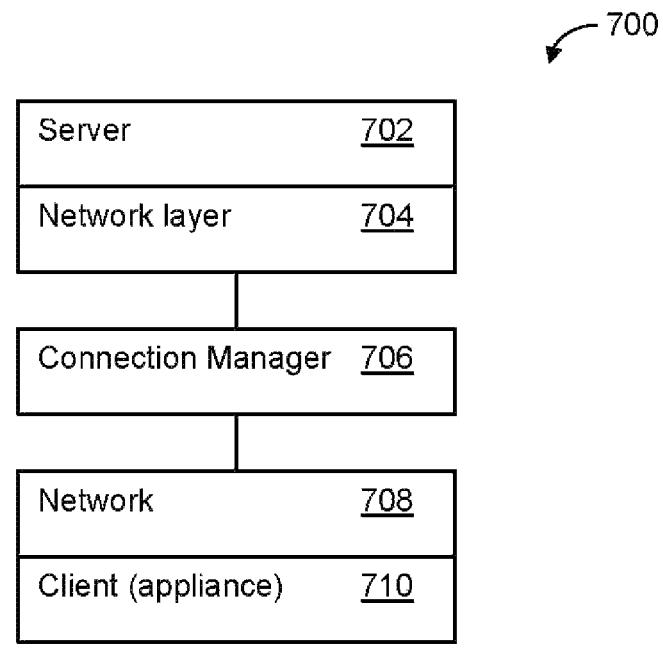
FIG. 7 illustrates one embodiment of a network stack.

FIG. 7 illustrates one embodiment of a network stack 700. Here, the client 710 interfaces to a network 708. The network 708 interfaces to the connection manager 706. The connection manager 706 interfaces to a network layer 704 that communicates with a server 702. If the client 710 is aware of the connection manager 706, the client may communicate through network 708, connection manager specific commands (CMSCS) that may be monitored and acted upon by the connection manager 706. These CMSCs may or may not be communicated through network layer 704 to the server 702. Likewise, if the server 702 is aware of the connection manager 706, it may issue CMSCs. For example, based upon the nature of requests reaching server 702 from clients, it may request of the connection manager 706 through a CMSC that its timeout for a disconnect be modified. Many capabilities of the connection manager and its mode of operation, communication, and interaction with the server 702 and client 710 may be affected by CMSCs.

Figure 8:
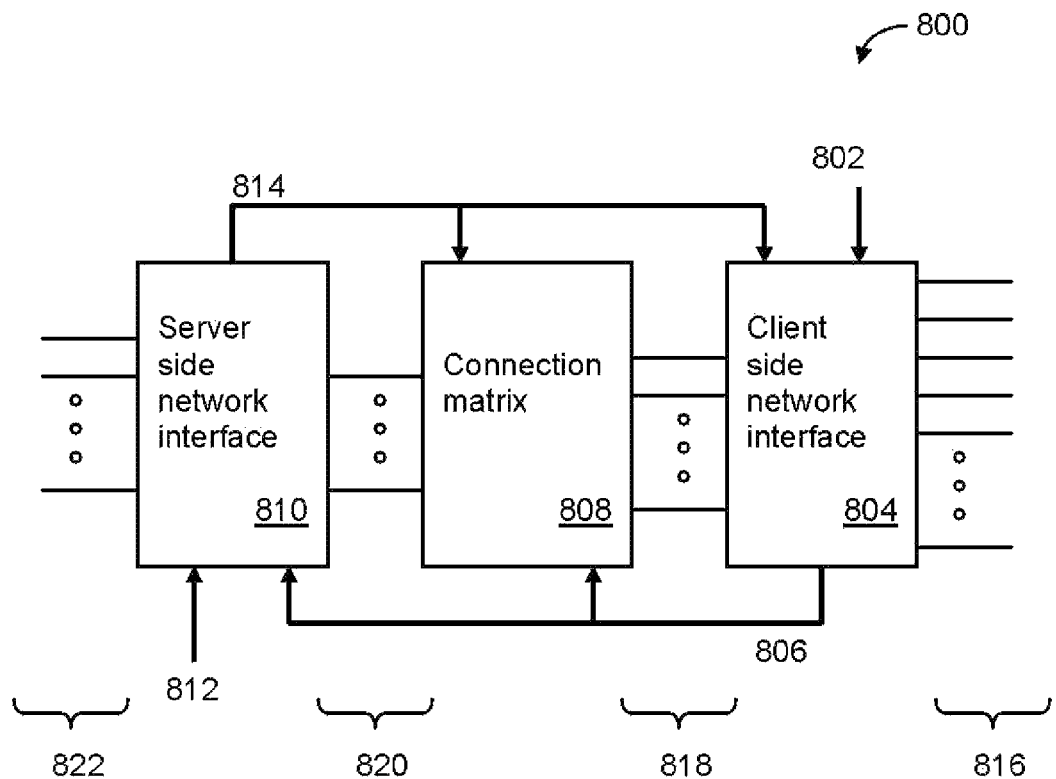
FIG. 8 illustrates one embodiment of a connection manager in block diagram form.

FIG. 8 illustrates one embodiment of a connection manager in block diagram form 800. A client side network interface 804 receives client connections via links 816, and command and status inputs 802 and 814, and generates a command and status output 806. The server side network interface 810 receives server connections via links 822, and command and status inputs 812 and 806, and generates a command and status output 814. Command and status 802 and 812 may originate, for example, from a microprocessor based system. Connection matrix 808 receives command and status inputs from 806 and 814. The connection matrix 808 also has links to the client side network interface 804 via links 818, and links to the server side network interface 810 via links 820.

In operation, in one embodiment, the client side network interface 804 receives a client connection request via one of the links 816. The client side network interface 804 establishes a connection with the clients. The connection matrix 808 is informed via 806 of the need to establish a connection with a server. The server side network interface 810 is also informed of the need to establish a connection with a server. Based on this information, the server side network interface 810 establishes a connection with a server via one of the links 822. The server side network interface 810 then informs via 814 the connection matrix 808 of the connection with the server. Connection matrix 808 then establishes a link between the client and the server via the connection matrix 808 links 818 to the client side network interface 804 and the links 820 to the server side network interface.

At tear down, in one embodiment, command and status signal 812 signals the server side network 810 to disconnect the server to client connection but maintain the client and server connection. This information is processed by the server side network interface 810 to maintain the connection to the server. Information is passed via 814 to the connection matrix 808 to disconnect, and to the client side network interface 804 to maintain the client connection. One skilled in the art will appreciate that many other options, commands, and control may be implemented via the block diagram in FIG. 8.

Thus, a connection manager may maintain many persistent connections to clients and establish fewer connections to servers, and establish these connections only when needed by the clients. Each transaction may be labeled with an identifier of the server and/or client (for example, one such approach may be to use the source and destination IP addresses to provide the labeling). For each client, a connection between the Connection Manager and the Server may be established whenever a client transaction occurs. The connection may be terminated when the transaction is complete.

The connection manager may be able to minimize system resources consumed by connections, by taking advantage of the fact that many connections may be idle. A connection may have multiple states, depending on, for example, its recent level of activity. For example, there may be three states of a connection: 1) Active—transferring data or ready to transfer immediately; 2) Standby—ready for transfer, connection state is maintained in memory, but buffers are released and must be re-allocated; and 3) Idle—inactive, buffers are released and state information is maintained, for example, on a disk. It may take a longer time to go Active when in the Idle state. After a period of inactivity, the connection may switch to Standby, then to Idle. A keep-alive signal may be transmitted periodically by the client (using empty TCP segments, for example). The TCP layer may be designed to manage this keep-alive mechanism while maintaining the Idle state.

Thus, what has been described is a connection manager, which by providing for persistent connections with many clients, allows for clients communications with servers that otherwise may have been inaccessible.

What follows are more detailed possible embodiments of the present invention. As mentioned previously, there are various techniques and approaches to practicing the present invention. One is as a server side implementation, the other as a client side implementation. There are two main server side implementations, 1) a server running a modified TOP network layer, and 2) a stand-alone appliance intervening between the client and server.

Figure 9:
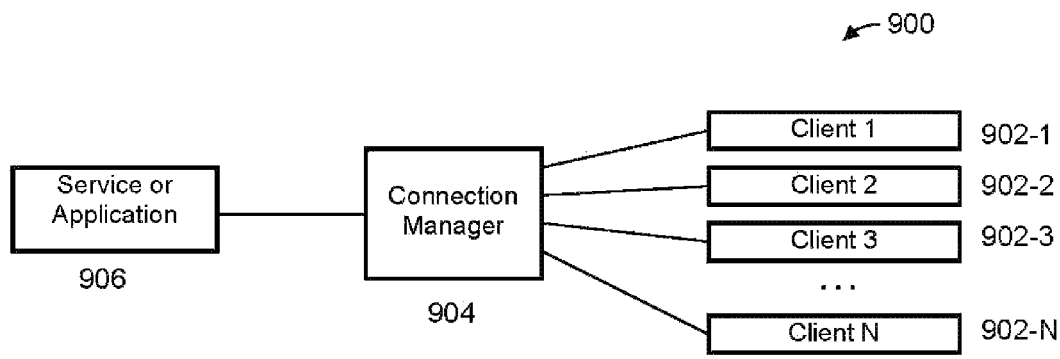
FIG. 9 illustrates one embodiment of the connection manager concept.

FIG. 9 illustrates one embodiment 900 of the connection manager 904 concept. Clients 1 to N (902-1 through 902-N) are connected to the connection manager 904. The service or application 906 is connected to the connection manager 904.

One embodiment of the present invention may effect a connection manager on a server. In these implementations, the connection manager function may run on the same machine as the server function. In this implementation, the Server's network stack incorporates a modified version of the TOP layer. Incoming connections are initially in an active state or "ready" state. Connections which are not actively transferring data may be transitioned to an inactive state where they consume less system resources.

Figure 10:
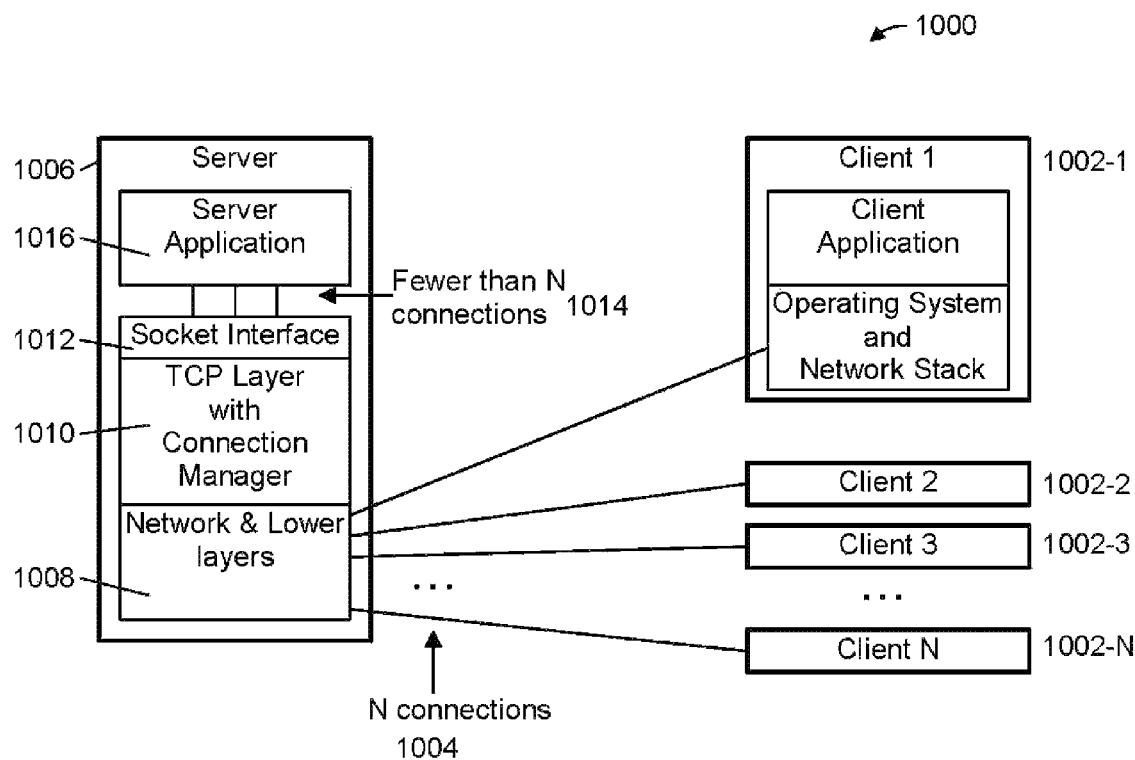
FIG. 10 illustrates one embodiment of a connection manager in a modified version of the TCP layer.

FIG. 10 illustrates one embodiment 1000 of a connection manager in a modified version of the TOP layer (see 1010). Clients 1 to N (1002-1 through 1002-N) are connected to the server's 1006 network and lower layers 1008 via N connections 1004. Moving upward from the network and lower layers 1008 is the TCP layer with the connection manager 1010, the socket interface 1012, the fewer than N connections 1014, and the server application 1016.

The behavior of the modified TOP layer may be further classified according to application socket lifetime variations. One such classification is into persistent and transient server application interfaces. In both cases, external client connections are always persisted by the TOP layer, however the difference is in the way the interface to the server application is handled.

In a persistent application interface, the application's "socket" is maintained as long as the client is connected to the server, even if the connection has been put in the inactive state. Depending on the style of socket interface used by the server application, it may be necessary to modify the application for this type of interface. For example, if the application expects network transmit buffers to always be available and writable, it will need to be modified do a buffer request first.

Figure 11:
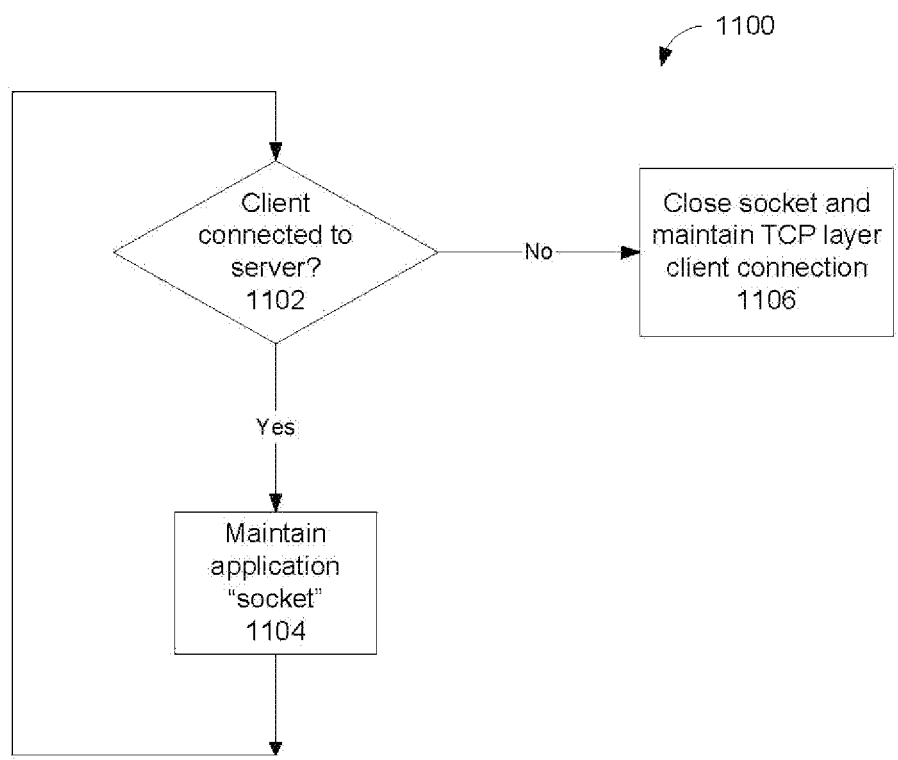
FIG. 11 illustrates one embodiment of a server side persistent API socket.

FIG. 11 illustrates one embodiment 1100 of a server side persistent API (application programming interface) socket. At 1102 a check is made to see if the client is connected to the server. If the client is connected to the server then the application socket is maintained 1104. If the client is not connected to the server then the socket is closed and the TOP client connection is maintained 1106.

In a transient application interface, the application's "socket" is closed when a client connection is transitioned to the inactive state. The modified TOP layer maintains the connection with the client even though the application sees the connection as being closed. When the application needs to transmit data to the client, it opens a connection (socket) to the client. The modified TCP layer maps the connection request to the already connected client after transitioning it to the active state. When the client sends data to the server, the TOP layer simulates a connection request to the application so it can pass the data up to the application. This behavior may be preferred if the application maintains a significant amount of session state information for each connection, keeps its own network buffers, or creates threads or processes for each connection, etc.

Figure 12:
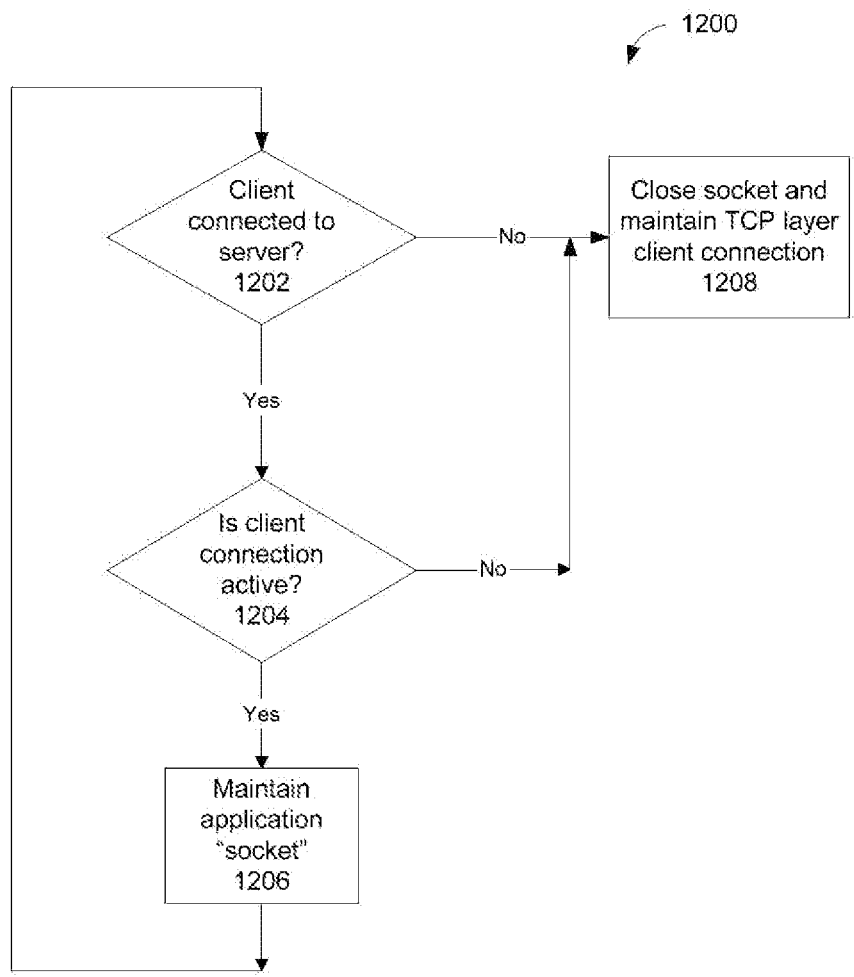
FIG. 12 illustrates one embodiment of a server side transient API socket.

FIG. 12 illustrates one embodiment 1200 of a server side transient API socket. At 1202 a check is made to see if the client is connected to the server. If the client is connected to the server then a check is made to see of the client connection is active 1204. If the client connection is active then the application socket is maintained 1206, and then a check is made to see if the client is connected to the server 1202. If the client is not connected to the server (checked at 1202) or the client connection is not active (checked at 1204) then the socket is closed and the TOP layer client connection is maintained 1208.

Other implementations are possible based on application interface variations (transparent, controllable, etc.). For example, in a transparent implementation, the CM's network interface may comply with the platform's traditional network interface to which the application has been written. That is, the presence of the CM appears invisible to the application and no modification is required to utilize a CM.

In a controllable implementation, in order to give the application additional control over the CM, an extended network interface may be employed. The interface extension may be in the form of additional function calls (methods) available on the network interface, and/or a separate module with its own set of methods. Thus, although it may be desirable to make the CM transparent to the server, so no modifications to server code (OS or application) is necessary, additional features may be made available if the server and/or client are "CM aware" and can issue commands to the CM itself. This may be accomplished through a separate control channel to the CM and/or by embedding CM commands in the payload of existing connections. By employing this control channel the server and/or client may control parameters for each connection such as: 1) timeout periods—the amount of time before connections are transitioned to inactive states, 2) whether or not keep-alives are necessary, 3) whether or not persistent connections are necessary or if the client can be connected to directly (i.e. not behind a firewall), 4) setting a connection to "always active", and 5) etcetera.

As mentioned previously, one embodiment of the present invention may have the connection manager (CM) as a stand-alone appliance. In the stand-alone appliance implementation, a specialized appliance intervenes between the server and the client. The CM appliance allows many simultaneous client connections but only requires the active connections to go to the server. The server Operating System (OS) requires no modifications and may use a standard TCP implementation in its network stack. The application may or may not require modifications to function with the CM appliance. There are various embodiments for the stand-alone appliance, such as, but not limited to, the connection manager as a transparent router appliance, the connection manager as a proxy appliance, etc.

Figure 13:
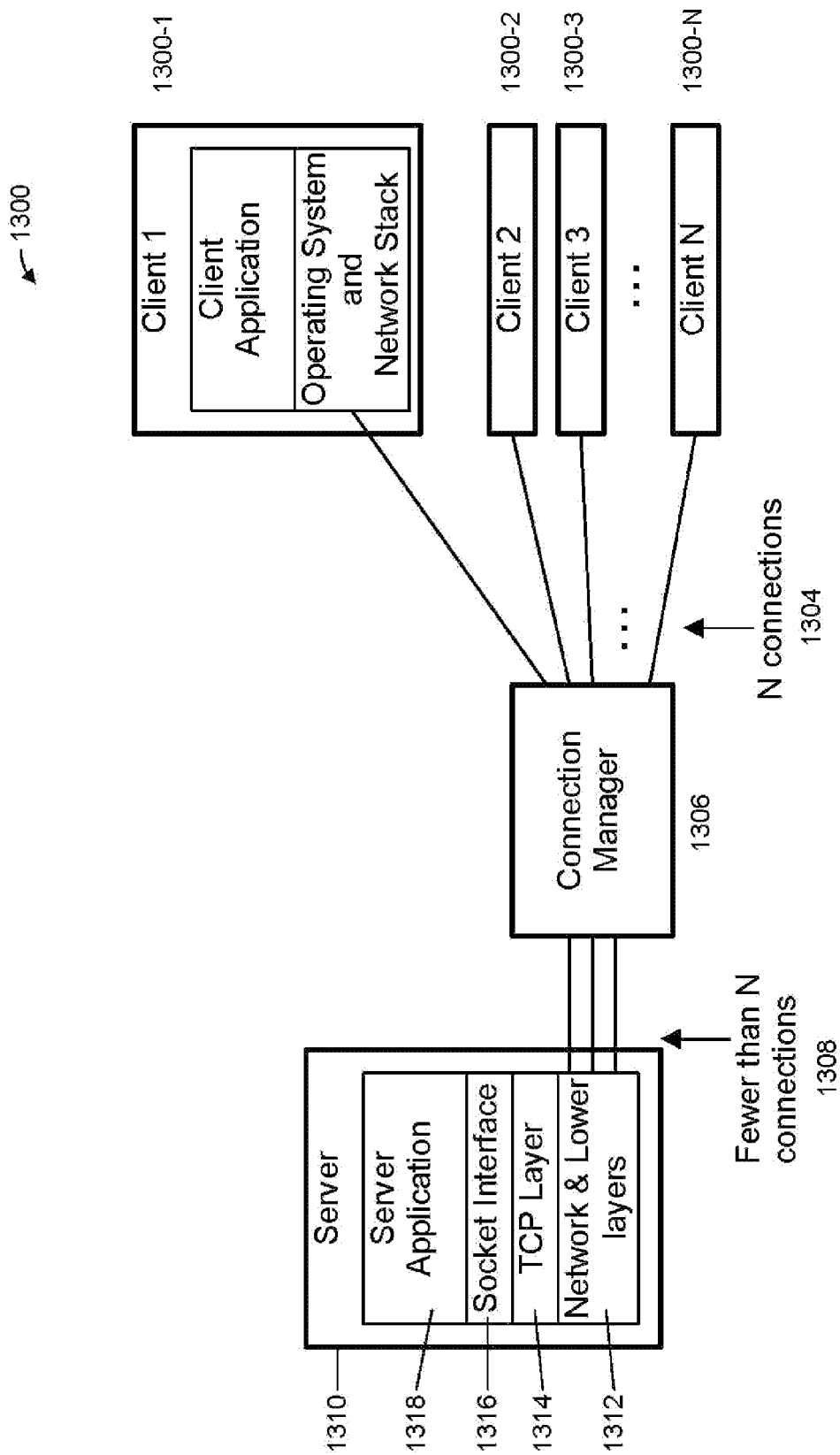
FIG. 13 illustrates one embodiment of a connection manager as an appliance.

FIG. 13 illustrates one embodiment 1300 of a connection manager 1306 as an appliance. Clients 1 to N (1302-1 through 1302-N) are connected via N connections 1304 to the connection manger 1306. The connection manager 1306 is connected to the server's 1310 network and lower layers 1312 via fewer than N connections 1308. Moving upward from the network and lower layers 1312 is the TCP layer 1314, the socket interface 1316, and the server application 1318.

One embodiment of the present invention is a connection manager as a transparent router appliance. In the transparent router appliance implementation, the CM behaves like a typical router, as seen from the server. It routes IP packets between the local network and the wide area network (WAN, Internet, etc.). The network may be set up to route all packets between the server and clients via the CM. When the server initiates a TCP connection to a client, instead of routing these packets, the CM recognizes them, and responds, pretending to be the client. It then passes data back and forth between the server and the pre-existing client connection. Clients on the WAN connect persistently to the CM router. The CM maintains the connections and may forward the connection to the server when the connection is actively transacting data. At a defined time, connections that are not active may be put in an inactive state and the CM to server connection may be closed. When the server requests a connection to a client which is already connected to the CM, the client connection is changed from inactive to active and the server request is linked to the existing connection. When the server is finished, it closes the connection. In response, the CM puts the CM-to-client connection in an inactive state and closes the CM-to-server connection.

Figure 14:
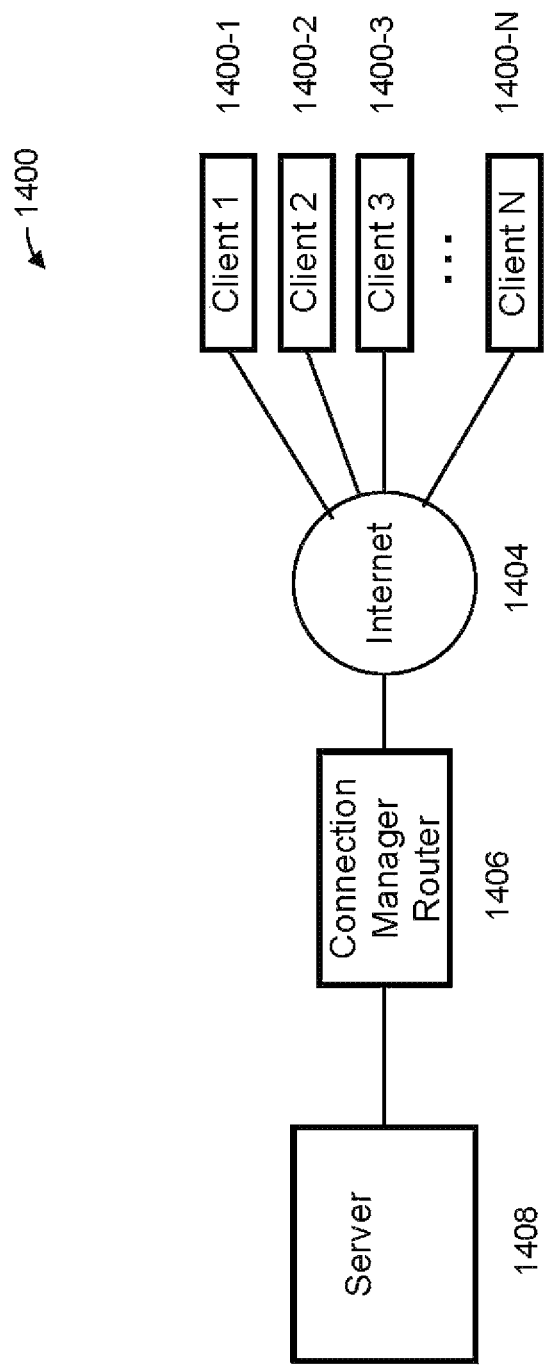
FIG. 14 illustrates one embodiment of the connection manager as a transparent router appliance.

FIG. 14 illustrates one embodiment 1400 of the connection manager 1406 as a transparent router appliance. Clients 1 to N (1402-1 through 1402-N) are connected to the Internet 1404. The connection manager router 1406 is connected to the Internet 1404, and to the server 1408.

In the proxy appliance implementation, the CM behaves like a typical proxy, as seen from the server. It acts on behalf of the server to create connections between the server and the WAN. The server connects to the proxy CM and makes client connection requests to the proxy using a standard proxy protocol. The CM proxy responds to the requests by forwarding data between the already existing client connection and the server. Clients on the WAN connect persistently to the CM proxy. The CM proxy maintains the client connections and may forward the connection data to the server when the connection is actively transacting data. At a defined time, connections that are not active may be put in an inactive state and the CM to server connection may be closed. When the server requests a connection to a client which is already connected to the CM, the client connection is changed from inactive to active and the server request is linked to the existing connection. When the server is finished, it closes the connection. In response, the CM puts the CM-to-client connection in an inactive state and closes the CM-to-server connection.

Figure 15:
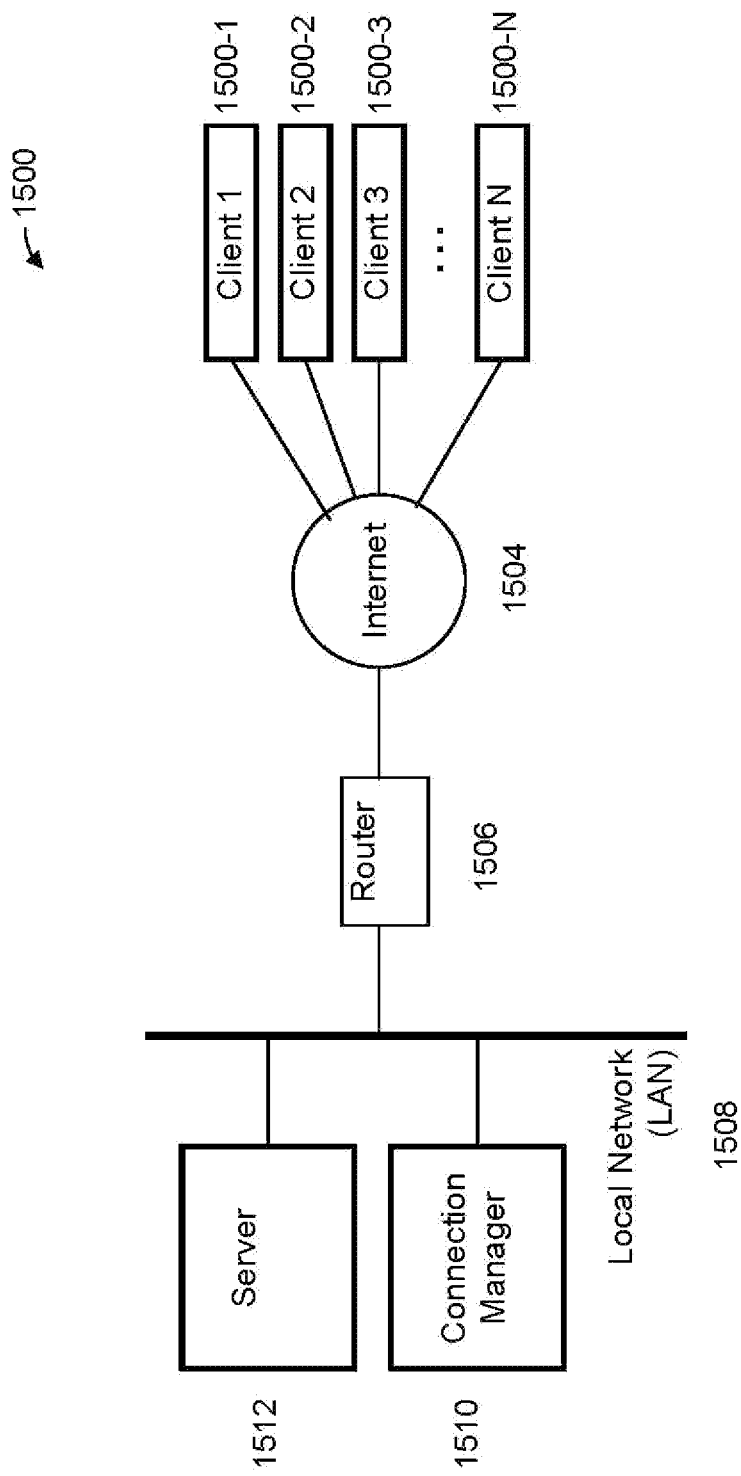
FIG. 15 illustrates one embodiment of the connection manager as a proxy appliance.

FIG. 15 illustrates one embodiment 1500 of the connection manager 1510 as a proxy appliance. Clients 1 to N (1502-1 through 1502-N) are connected to the Internet 1504. The connection manager 1510 and the server 1512 are connected to a Local Network (LAN) 1508. Also connected to the LAN 1508 is the router 1506, and the router 1506 is connected to the Internet 1504.

In either the Transparent Router or Proxy implementation, if the application running on the server is "aware" of the CM, it may also establish a control connection to the CM. The control connection allows the server to manage the CM and allows the CM to report status to the server. Utilizing this feature requires adding functionality to the server application and/or OS (i.e. CM awareness). Control capabilities may include: 1) timeout periods—the amount of time before connections are transitioned to inactive states, 2) whether or not keep-alives are necessary, 3) whether or not persistent connections are necessary or if the client can be connected to directly (i.e. not behind a firewall), 4) setting a connection to "always active", and 5) etcetera.

Client side implementations of the present invention may be classified according to the level of modification of the existing client that is possible (modifiable, non-modifiable, etc.). Specifically, the modification mainly concerns connection behavior, i.e. when and how it connects to the server.

If the client's behavior can be modified, the client may be programmed to connect to the server (connection manager) immediately upon power-up, and maintain the connection indefinitely. If the connection is dropped, the client may attempt to reestablish the connection.

Figure 16:
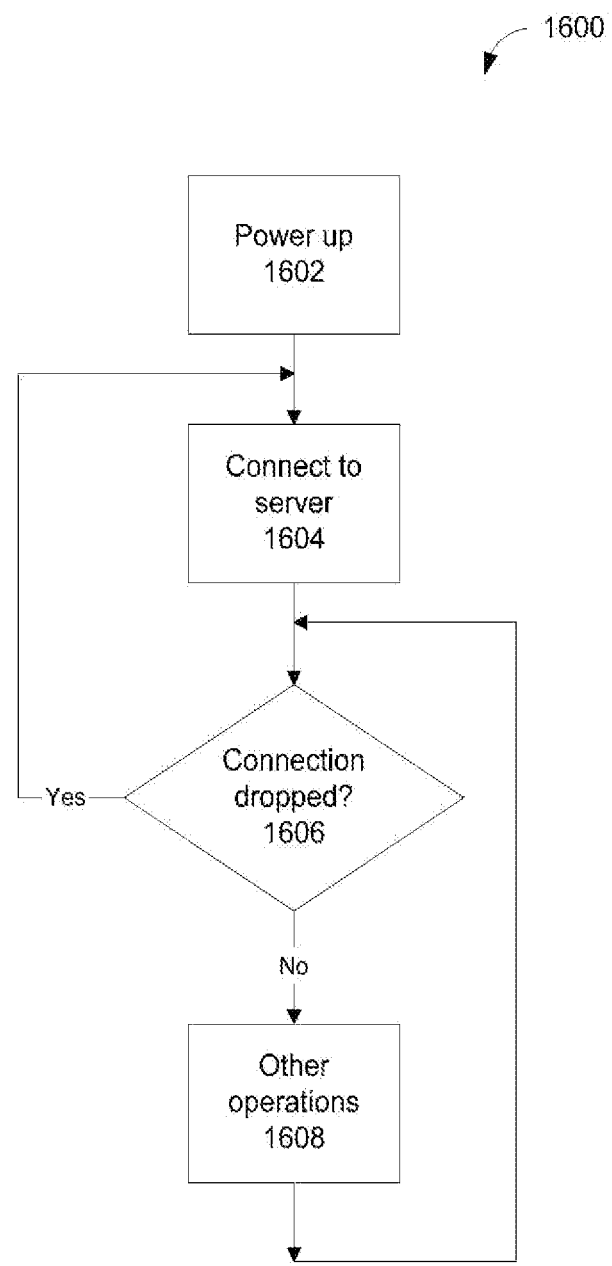
FIG. 16 illustrates one embodiment of a modifiable client.

FIG. 16 illustrates one embodiment 1600 of a modifiable client. After powering up 1602, connection is made to the server 1604. A check is then made to see if the connection has been dropped 1606. If the connection has not been dropped then other operation 1608 are performed and then a check is made to see if the connection has been dropped 1606. If the connection has been dropped (at 1606) then a connection is made to the server 1604.

If the client's application is non-modifiable then another technique may be used. If the client application does not normally maintain a persistent connection to the server, and its behavior is not modifiable, it may be necessary to run an agent at the client location to maintain a connection to the server's CM and acts as a proxy between the server's CM and the client. This agent may reside in the client, either sharing a network stack and/or having its own. It may also be a separate module or box, and should be on the same side of the firewall and thus can establish connections to both the CM and the client. Generally there are two types of clients to consider, 1) a connection-initiating client, and 2) a connection-accepting client.

A connection-initiating client may normally initiate connections for the duration of a transaction (session) and then disconnect. One embodiment of the present invention is to simulate a persistent connection to the server so the server can initiate transactions at any time, even though the client may not be connected.

One approach is to use an agent running on the client side of the firewall. The agent maintains a persistent "control channel" connection to the CM. When the client needs to initiate a connection, it does so normally. When the server needs to connect to the client, it requests the connection through the CM which in turn sends a request command to the client agent through the control channel. The agent then notifies the client application to connect to the server.

Figure 17:
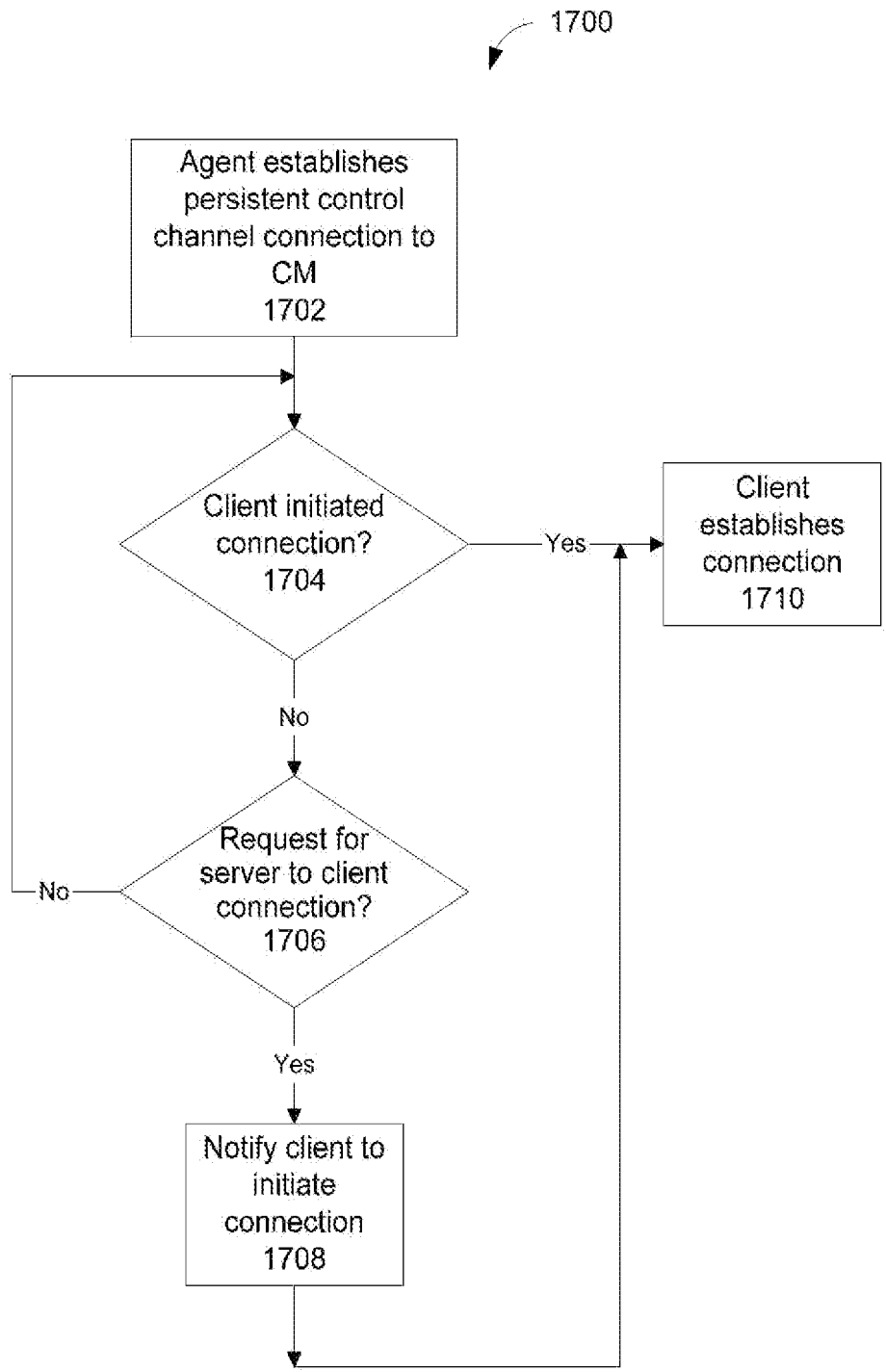
FIG. 17 illustrates one embodiment of a connection initiating client with an agent.

FIG. 17 illustrates one embodiment 1700 of a connection-initiating client with an agent. The agent establishes a persistent control channel connection to the CM 1702. Next, a check is made to see if the client has initiated a connection 1704. If the client has initiated a connection, then the client establishes the connection 1710. If the client had not initiated a connection, then a check is made to see if there is a request for a server to client connection 1706. If there is a request for a server to client connections, then the client is notified to initiate a connection 1708, and the client establishes a connection 1710. If there is no request for a server to client connection (checked at 1706) then a check is made to see if the client has initiated a connection 1704.

Figure 18:
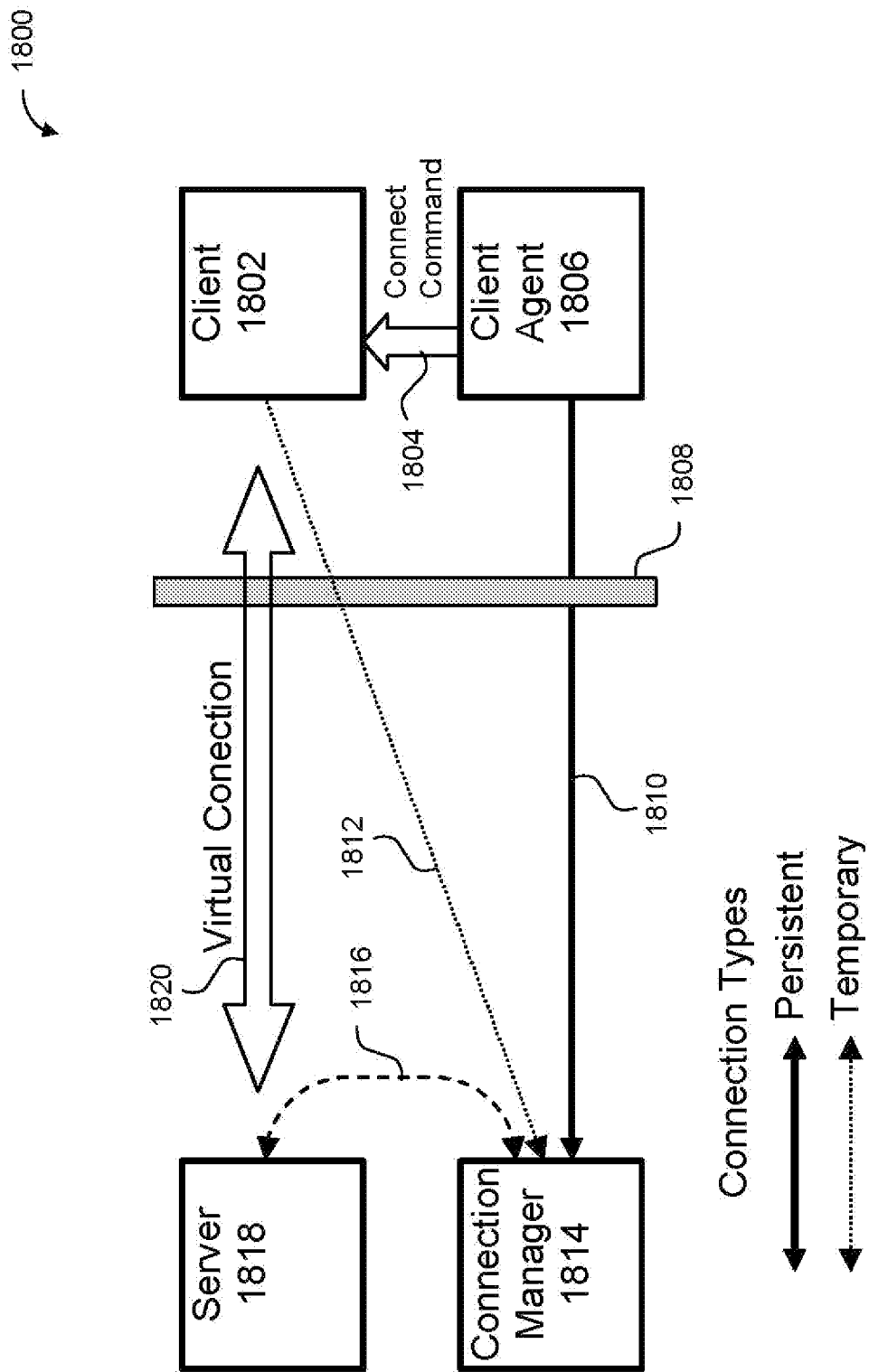
FIG. 18 illustrates one embodiment of a connection initiating client, an agent, and the connection manager.

FIG. 18 illustrates one embodiment 1800 of a connection-initiating client 1802, a client agent 1806, and the connection manager 1814. The client agent 1806 establishes a persistent connection 1810 with the connection manager 1814 through any firewall 1808 that may be present. Additionally, the client agent 1806 interfaces with the client 1802 via a connect command 1804. This connect command 1804 could be issued to the client 1802 via a network or some other signal or communication channel. The client 1802 may communicate with the CM 1814 via link 1812. The server 1818 may communicate with the CM 1814 via link 1816.

One example of operation may be the following. The server 1818 communicates via link 1816 to the CM 1814 for a connection to the client 1802. The CM 1814 communicates this request via 1810 to the client agent 1806 which communicates via the connect command 1804 to the client 1802. In response the client 1802 initiates a connection via link 1812 to the CM 1814 which can communicate with the server 1818, thus establishing a virtual connection (as shown at 1820) between the server 1818 and the client 1802. When the communication session is completed only link 1812 will be torn down.

A connection-accepting client normally expects to receive connections and does not initiate connections. If the client is behind a firewall it may not be reachable by the server. If client's connection behavior cannot be modified, an agent may be used. The agent maintains a persistent control channel connection to the CM. When the server needs to connect to the client, it requests the connection through the CM which in turn sends a request command to the client agent through the control channel. The agent then creates a data connection to the CM and creates a second data connection to the client. This second data connection may be, for example, on its normal listen socket. The agent then passes the connection data between the server and the client, linking them together.

When the transaction/session is complete and the server disconnects, all connections are closed except the CM to agent control connection.

Figure 19:
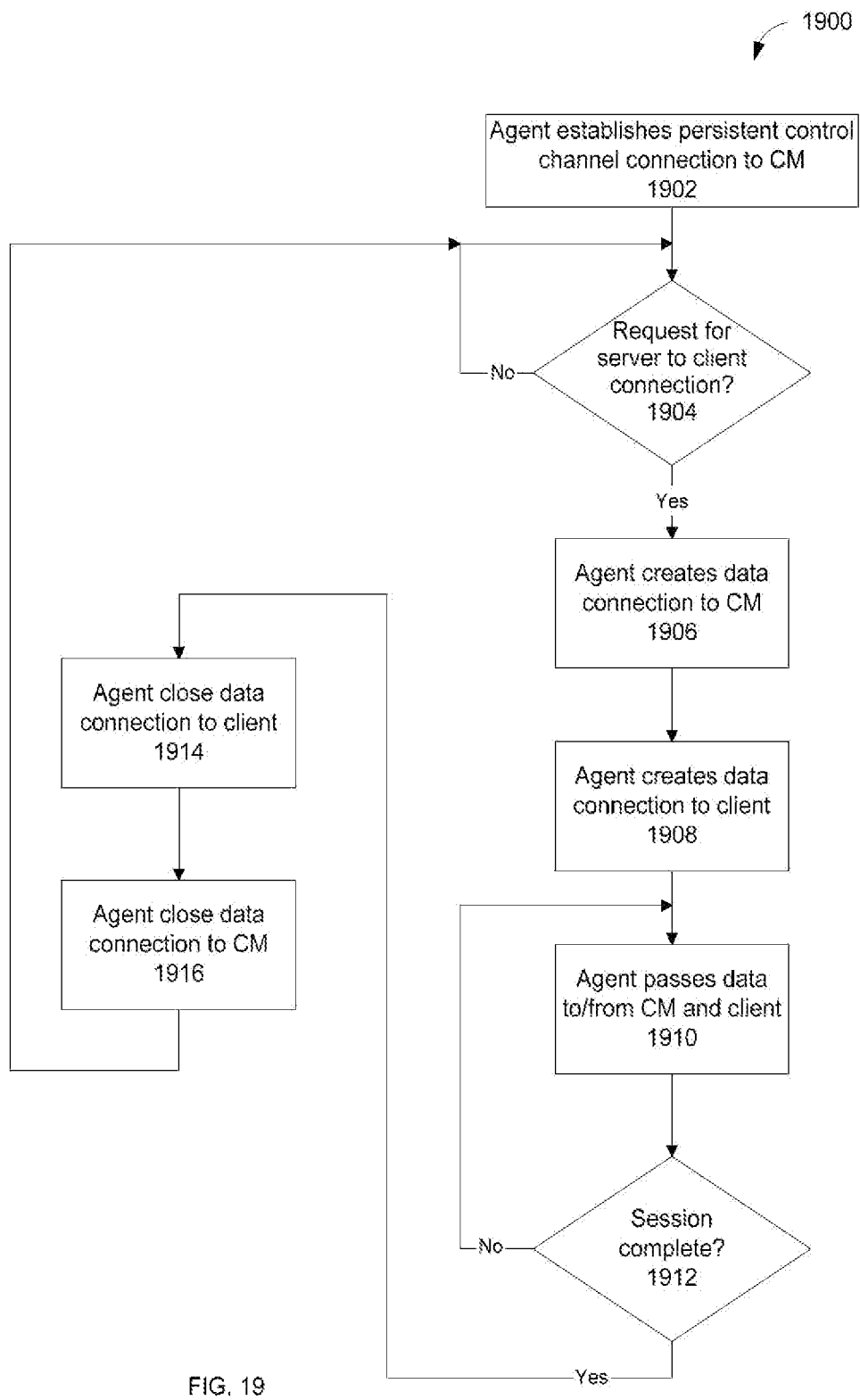
FIG. 19 illustrates one embodiment of the present invention with a connection accepting client with an agent.

FIG. 19 illustrates one embodiment 1900 of the present invention with a connection-accepting client with an agent. An agent establishes a persistent control channel connection to the CM 190Z A check is made to see if there is a request for a server to client connection 1904. If there is no request for a server to client connection then loop back and check again (done at 1904). If there is a request for a server to client connection then the agent creates a data connection to the CM 1906. Next the agent creates a data connection to the client 1908, and at 1910 the agent passes the data between the client and the server via the CM. Next a check is made to see if the session is complete 1912. If the session is not complete then loop-back and the agent passes the data to/from the CM and client 1910. If the session is complete (checked at 1912) then the agent closes the data connection to the client 1914, then the agent closes the data connection to the CM 1916, and then a check is made to see if there is a request for a server to client connection 1904.

Figure 20:
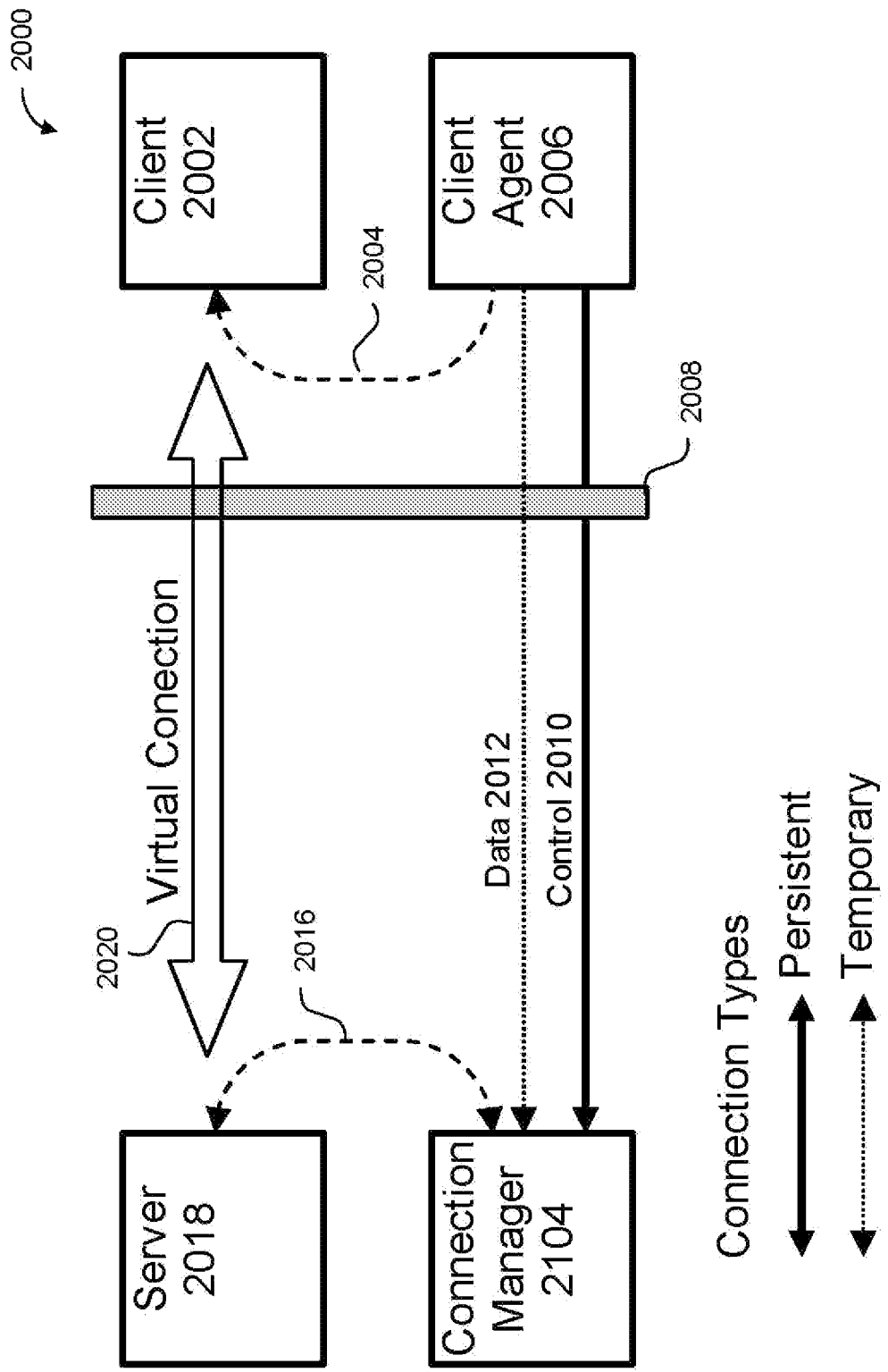
FIG. 20 illustrates one embodiment of a connection accepting client, an agent, and the connection manager.

FIG. 20 illustrates one embodiment 2000 of a connection accepting client 2002, an agent 2006, and the connection manager 2014. The client agent 2006 establishes a persistent connection 2010 with the connection manager 2014 through any firewall 2008 that may be present. Additionally, the client agent 2006 interfaces/communicates with the client 2002 via a link 2004. The client agent 2006 may communicate with the CM 2014 via link 2012. The server 2018 may communicate with the CM 2014 via link 2016.

One example of operation may be the following. The server 2018 communicates via link 2016 to the CM 2014 for a connection to the client 2002. The CM 2014 communicates this request via 2010 to the client agent 2006 which opens the link 2012. Information is then transferred to/from the CM 2014 over the link 2012 to/from the client 2002 via the link 2004 to the client agent 2006. Thus, the server 2018 can communicate with the client 2002, thus establishing a virtual connection (as shown at 2020) between the server 2018 and the client 2002. When the communication session is completed link 2012 may be torn down.

Connection management may involve technical issues when managing a large number of persistent connections on a single machine. These issues may include, but are not limited to, server resource management, connection transition control, inactive or extended connection table description, and keep-alive signal management.

Server resource management may affect how connections are managed. In typical TCP implementations, each open connection may take a considerable amount of server resources. Even inactive connections may consume these resources. These resources may include, buffers, connection state tables, processes/threads, CPU resources, etc.

Network data buffers for transmit and receive are typically allocated when the connection is established and are kept for the duration of the connection. This consumes system memory (RAM). Connection state tables or data structures are created for each connection which maintain the state of the connection and references to its buffers. This also consumes system memory. Many servers and applications create a new process or thread for each connection. Each process or thread has its own associated data table, as well as stack space which consumes system memory. CPU overhead is increased with each thread managed by a multitasking kernel. In addition to the above mentioned burdens on the CPU, each connection adds burden in the form of cycles spent scanning tables every time data is received. Each time the server receives data (for example, every 100 to 2 k bytes), it scans the table of open connections to match the data packet to the connection so it may properly route the data. As the list of connections grows, a larger and larger amount of system resources and CPU time are consumed. With TCP, even transmit data will generate receive data overhead since there are acknowledge packets from the receiving end.

In one embodiment of the present invention, to reduce the consumption of resources, connections which have no data activity are put in an inactive state. When a connection is transitioned from active to inactive, the following actions may be taken. The connection is removed from the active connection list and moved to an inactive connection list. Network buffers dedicated this connection are freed. Any threads or processes dedicated to this connection are terminated. Any connection state data held in system memory is moved to "slower" memory. Slower memory may include a disk or a database. Moving data to a database may have the advantage of allowing faster search and retrieval but may also impose a higher system burden in processing database requests.

The inactive connection state may actually have several levels. For example there could be three states to a connection. One is active, where the connection is actively transferring data or is ready to transfer data. Second, inactive-idle, where the connection is transitioned to the inactive table, buffers are freed, and threads killed. Third, inactive-sleep, where the connection state data is saved to slower memory.

Connections which are not transferring data may be initially transitioned from active to idle. Later the connections may be transitioned to the sleep state after a specified time interval or in response to a system monitor alert, etc.

Figure 21:
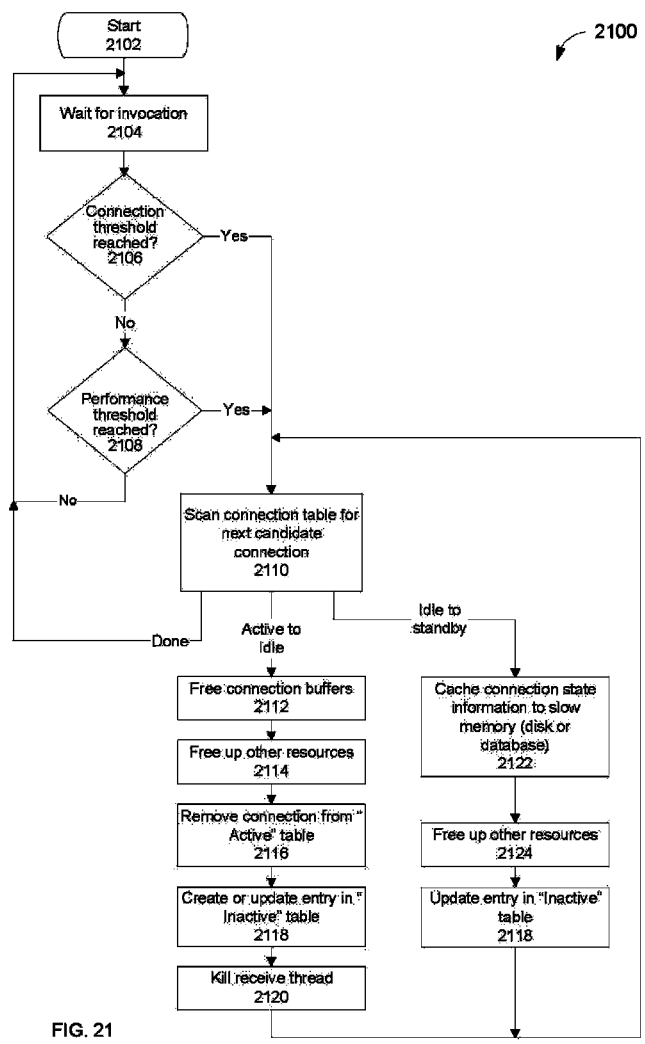
FIG. 21 illustrates one embodiment of an implementation of a monitoring and processing thread in a connection manager.

FIG. 21 illustrates one embodiment 2100 of an implementation of a monitoring and processing thread in a connection manager. This may be invoked periodically, any time a new client connection is made, if a system monitor indicates a critical threshold is reached, such as low memory, low performance, etc., or any combination of these or other events.

At 2102 the flow chart starts and at 2104 a wait is made for invocation. When invoked a check is made to see if a connection threshold has been reached 2106. If a connection threshold has not been reached then a check is made to see if a performance threshold has been reached 2108. If a performance threshold has not been reached then loop back to waiting for an invocation 2104. If a connection threshold has been reached (as checked at 2106) or a performance threshold has been reached (as checked at 2108) then at 2110 a scan is made of the connection table (hereinafter called a connection table scan) for the next connection which may be a candidate for transition to an inactive state. The connection table scan is performed in accordance with an established policy which defines conditions and priorities for connection state transition. If the connection table scan indicates that a connection may be transitioned from idle to standby then at 2122 the connection state information is cached to a slower memory (for example, a disk or database). At 2124 other resources are freed up, at 2126 the entry in the inactive table is updated, and then loop back to the connection table scan 2110. If the connection table scan indicates that a connection may be transitioned from active to idle then at 2112 connection buffers are freed, at 2114 other resources are freed up, at 2116 the connection is removed from the active table, at 2118 an entry is created or updated in the inactive table, the receive thread is killed 2120, and then loop back to the connection table scan 2110. If the connection table scan is done, then loop back to 2104 waiting for an invocation.

The CM may employ several mechanisms to determine when connections are transitioned from active to inactive state, such as server activity, timer, performance monitor, explicit control, etc. For example, based on server activity the client connection may be transitioned from active to the lowest inactive level ("sleep" for example) when the server closes the connection to the CM. A time interval may be specified. After a connection has been "quiet" (no data activity) for that period of time, it may be transitioned from active to inactive. Additional intervals may be specified to transition the inactive connection to lower levels of inactive (i.e. from idle to sleep). The CM may run a performance monitor which monitors CPU loading and memory usage. When preset thresholds are met, the CM is notified. The CM scans its connections and determines those that have been quiet for the longest period of time and transitions them to the next lower level of inactivity. Explicit control commands from the server and/or the client may command the CM to put a specific connection in a specified state. Command data may be sent to the CM either through a separate control connection and/or in the existing data connection by including CM specific commands in the data payload.

In one embodiment of the present invention, a second connection table is used to describe inactive connections. Inactive connections are transferred to this second connection table, which may be processed by the server at a lower priority than the active connection table. For efficiency, active connections are also kept in the table. The data is not used by the server because the active table entry contents are processed first and contains all the necessary information for processing active connections. The table may contain, but is not limited to, the following entries for each connection. For a socket, the address and port of the client and server. Status state, such as active, standby, idle. Other states may be possible. Timestamp for timeout, which may contain a real-time stamp representing the earliest time at which this connection may be transitioned to the next lower state of inactivity. This time stamp may be computed whenever the state of the connection is changed. Time intervals for each transition, that is, one or more entries representing the minimum times of inactivity which must elapse before transitioning this connection to the next lower state of inactivity. This allows transition times to be set for each client, although most applications may use global values which apply to all connections. State data reference, that is, reference to the location of the cached state data for this connection. This may be a reference to disk storage, database entry, or any other memory location where the state info has been saved. Sequence number, the current TCP sequence number for the connection. This may need to be maintained in system memory for connections which require a keep-alive signal.

In one possible embodiment of the present invention via a TOP layer implementation, the server scans the "active connection" table when data is received looking for a connection match. If a match is found, the TCP processing proceeds normally. If a connection match is not found, the TCP segment information is passed to another lower priority thread which processes inactive connections. The "inactive connection" thread searches the (possibly larger) inactive connection table for a match and transitions the inactive connection to the active state and passes the TOP segment back to the active connection processing thread which handles it as a normal active connection. Since this all may happen at a lower priority, it may take longer to respond to an inactive connection as compared to an active connection.

Keeping persistent connections open may be an issue. Some routers (like NAT (network address translation) routers) maintain connection state information and may timeout a connection after there has been no data activity for a period of time. To avoid the connection between the Client and CM from being closed by an intervening router, it may be necessary to send periodic "keep-alive" messages. These may be application level data or simply empty TOP segments. Since these keep-alive messages must be sent relatively frequently, it is desirable not to bring a connection to the active state in order to generate or respond to a keep-alive message. The simplest and most transparent solution may be to use empty TCP segments for the keep-alive signal. In response to the empty segment, the receiving end must acknowledge the empty segment. This periodic transaction may be sufficient to reset the disconnect timer of an intervening router(s).

Note that using this approach, the challenge here is properly handling the TCP sequence number, which must be incremented for each TCP segment sent from either side of the connection. Each data direction of a connection has an independent sequence number which is incremented each time a segment is sent to the other side by the number of octets in the segment. Therefore, the CM must maintain (at least) the transmit sequence number for each connection so it can transmit keep-alive signals to the client, or acknowledge keep-alives received from the client. There are a variety of possible solutions, including but not limited to the following. One, the TCP sequence number may be stored in the "inactive" connection table. When the server responds to a keep-alive, or needs to send a keep-alive, it gets the sequence number from the table, uses it for the current keep-alive, and then updates the table with the next sequence number if necessary. Second, the client could send keep-alive info in its keep-alive message. This may require modification of TCP layer, Third, the server may calculate the sequence number based on time and knowledge of frequency of keep-alive signals.

Figure 22:
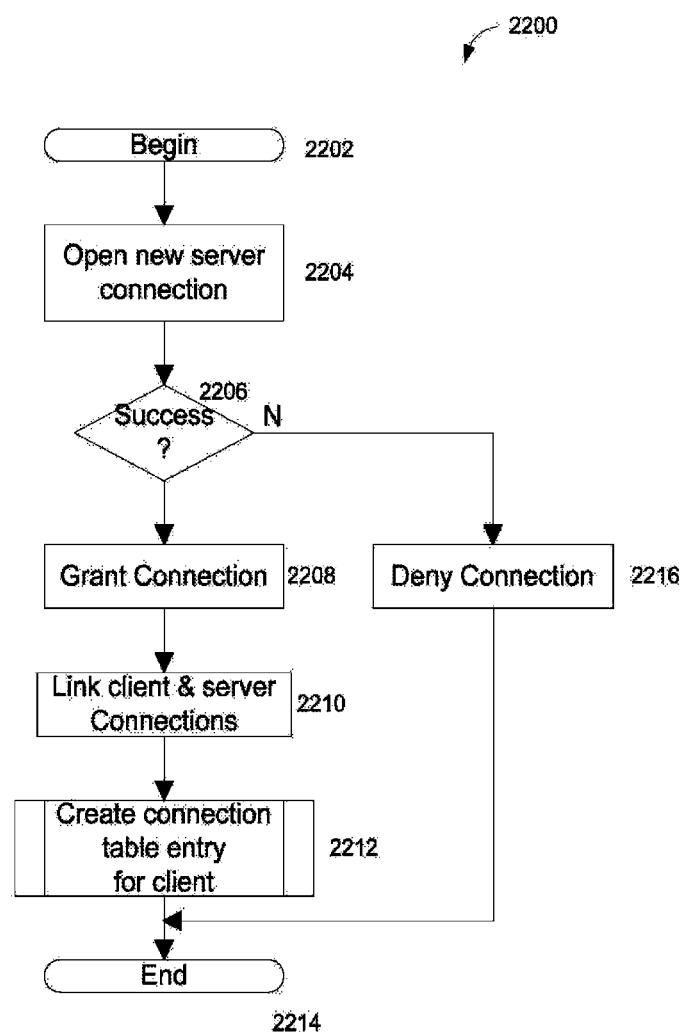
FIG. 22 illustrates one embodiment of the present invention for a client to server connection request.

FIG. 22 illustrates one embodiment 2200 of the present invention for a client to server connection request. The flow chart illustrates what the connection manger does in response to a connection request from a client. At 2202 the flow begins when a client attempts to connect to the server via the CM. At 2204 a new server connection is opened. At 2206 a check is made to see of the new server connection was opened successfully. If the new connection was successfully opened then at 2208 the connection is granted, and at 2210 the client and server connections are linked. Next a connection table entry is created for the client 2212, then the end 2214 is reached. If the new server connection was not established successfully (as checked at 2206), the connection is denied 2216, and then the end 2214 is reached.

Figure 23:
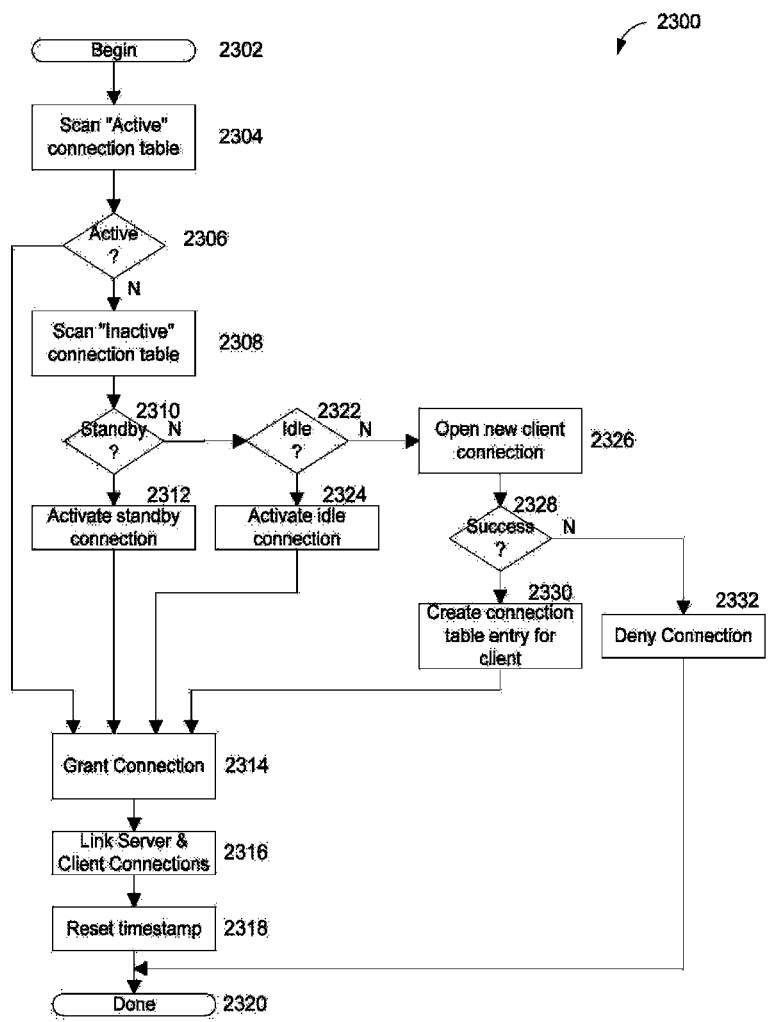
FIG. 23 illustrates one embodiment of the present invention for a server to client connection request.

FIG. 23 illustrates one embodiment 2300 of the present invention for a server to client connection request. The flow chart illustrates what the connection manger does in response to a connection request from the server. At 2302 the flow begins when the server attempts to connect to a client which is managed by the CM. At 2304 a scan is made of the active connection table. A check is made at 2306 to see if the connection is active. If the connection is not active then a scan of the inactive connection table is made 2308, and at 2310 a check is made to see if the status is standby. If the status is standby then at 2312 the standby connection is activated, at 2314 the connection is granted, at 2316 the server and client connections are linked, at 2318 a timestamp is reset, and then the flow is done 2320.

If the connection is active (as checked at 2306) then at 2314 the connection is granted, at 2316 the server and client connections are linked, at 2318 a timestamp is reset, and then the flow is done 2320.

If, at 2310 the check determines that the status is not standby, then a check is made at 2322 to see if the status is idle. If the status at 2322 is idle then at 2324 the idle connection is activated, at 2314 the connection is granted, at 2316 the server and client connections are linked, at 2318 a timestamp is reset, and then the flow is done 2320.

If, at 2322 the check determines that the status is not idle, then at 2326 a new client connection is opened, at 2328 a check is made to see if the connection was successful. If the connection was successful (as tested at 2328) then a connection table entry is created for the client, at 2314 the connection is granted, at 2316 the server and client connections are linked, at 2318 a timestamp is reset, and then the flow is done 2320. If the connection was not successful (as tested at 2328) then the connection is denied 2332, and the flow is done 2320.

Figure 24:
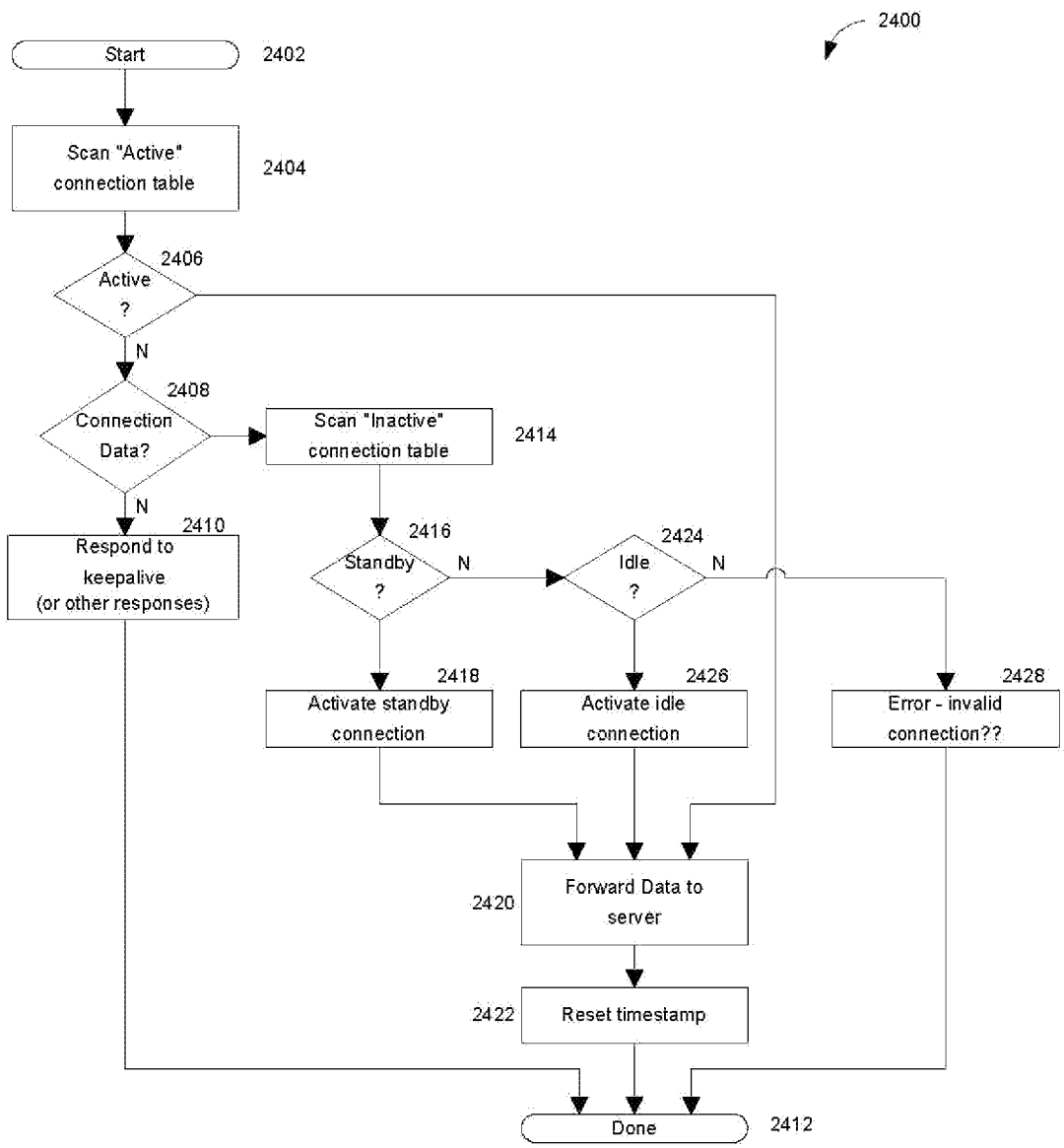
FIG. 24 illustrates one embodiment of the connection manager receiving client data.

FIG. 24 illustrates one embodiment 2400 of the connection manager receiving client data. The flow chart illustrates what the connection manger does when data is received from a connected client. At 2402 the flow starts with the receipt of a TOP data segment from the client destined for the server. At 2404 a scan is made of the active connection table. A check is made at 2406 to see if the connection is active. If the connection is not active then a check is made to see if there is connection data 2408. If there is no connection data then this data is either a response to a keep-alive signal or some other response 2410 to a control signal which can be processed without activation the connection, and the flow is done.

If at 2406 the connection is active, then at 2420 data is forwarded to the server, at 2422 a timestamp is reset, and at 2412 the flow is done.

If at 2408 there is connection data, then a scan is made of the inactive connection table. Next a check is made at 2416 to determine if the connection is in standby. If the connection (as checked at 2416) is in standby, then at 2418 the standby connection is activated, at 2420 data is forwarded to the server, at 2422 a timestamp is reset, and at 2412 the flow is done.

If the connection is not in standby (as checked at 2416) then a check is made to see if the connection is idle 2424. If the connection is idle then at 2426 the idle connection is activated, at 2420 data is forwarded to the server, at 2422 a timestamp is reset, and at 2412 the flow is done.

If the connection is not at idle (as checked at 2424) then at 2428 an error is flagged with an invalid connection, and at 2412 the flow is done.

One of ordinary skill in the art will appreciate that other techniques are possible, for example, auto-determination/training. For example, if the server attempts to connect to a client and fails multiple times, it may be assumed to be behind a firewall. The next time the client connects, the server or CM may instruct the client to maintain a persistent connection.

Figure 25:
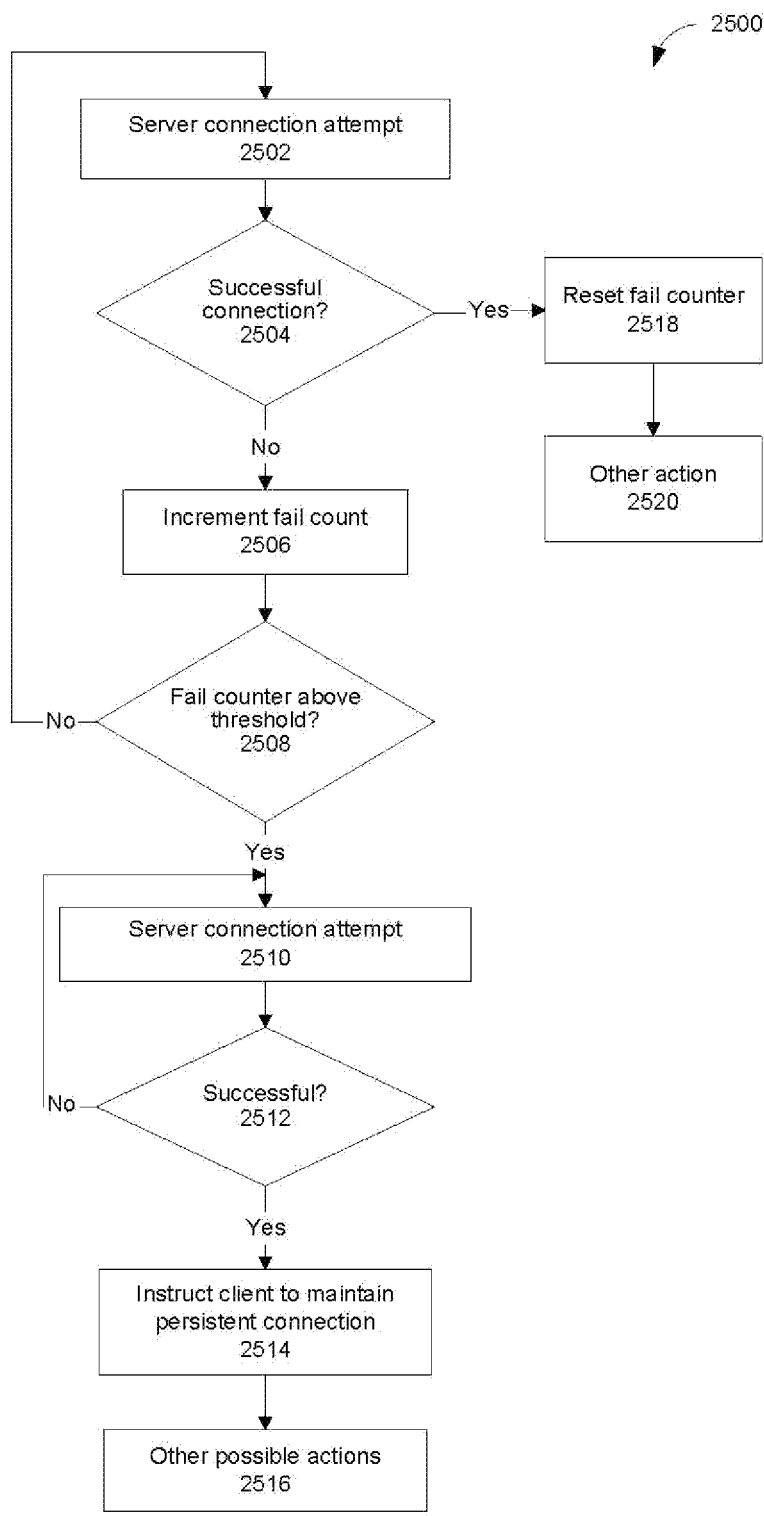
FIG. 25 illustrates one embodiment of the present invention showing an auto-determination.

FIG. 25 illustrates one embodiment 2500 of the present invention showing an auto-determination. At 2502 a server connection is attempted. Next a check is made at 2504 to see if the connection was successful. If the connection was successful, then the fail counter is reset 2518, and other actions are taken 2520. If the connection was not successful (as determined at 2504), then a fail count is incremented 2506. At 2508 the fail count is checked to see if it is above a threshold. If the fail count is not above a threshold, then loop back to 2502 where a server connection is attempted. If the fail count is above a threshold (as checked at 2508), then a server connection attempt is made 2510. At 2512 a check is made to see if the server connection was successful. If the server connection (as checked at 2512) was not successful, then loop back to 2510 where a server connection attempt is made. If at 2512 it is determined that the server connection attempt was successful, then at 2514 the client is instructed to maintain a persistent connection, and then at 2516 other possible actions.

Thus, what has been described are some of the various possible embodiments of a connection manager, which by providing for persistent connections with many clients, allows for clients communications with servers that otherwise may have been inaccessible.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
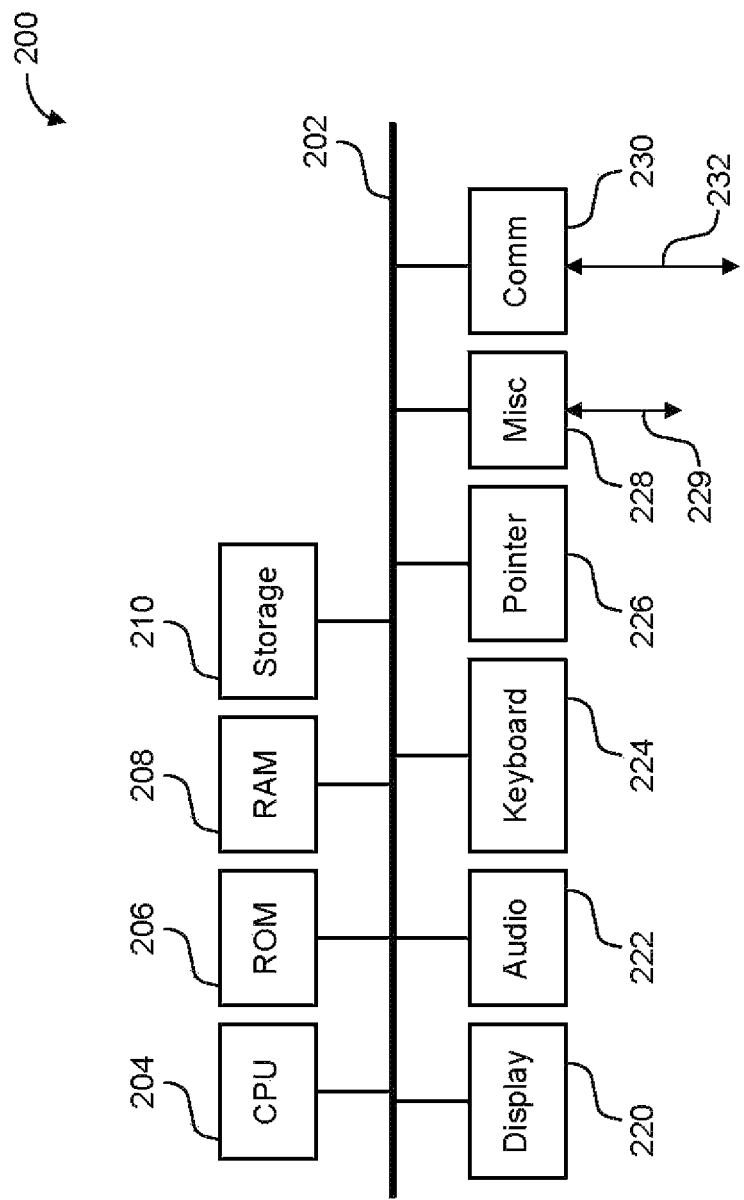
FIG. 2 is a block diagram of a computer system embodiment.
Figure 3:
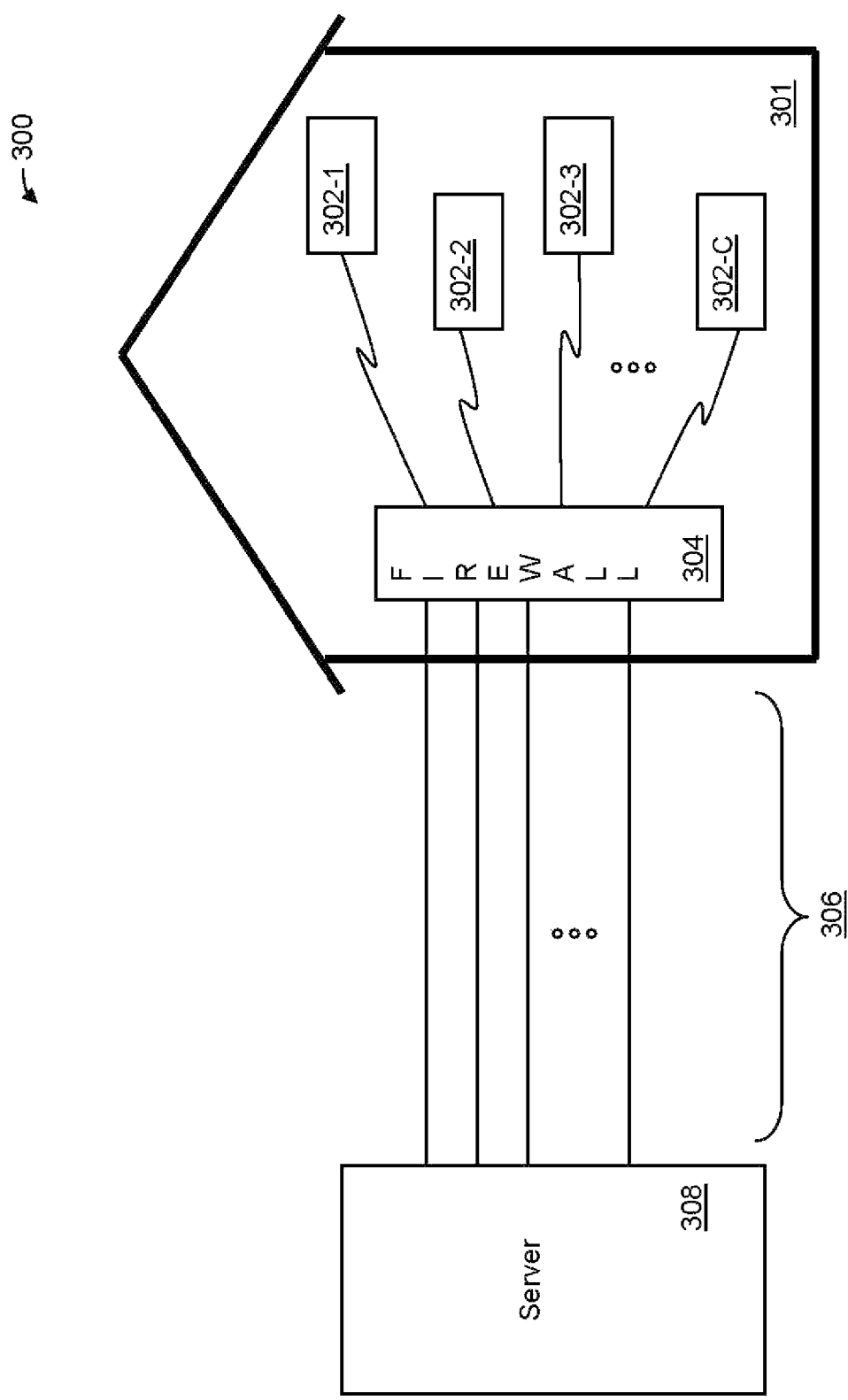
FIG. 3 illustrates one embodiment of clients behind a firewall.

FIG. 2 illustrates a computer system 200 in block diagram form, which may be representative of any of the clients and/or servers shown in FIG. 1, as well as, devices, clients, and connection managers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Reference has been made to device(s) and client(s). These terms, as understood by one skilled in the art, are often considered interchangeable and/or having the same essence in differing situations. For example, a consumer may consider a music player a device, however from a network point of view the music player may be considered a client. What is to be appreciated is that in the art, the words sometimes have meanings commensurate with the surrounding environment, and yet often the words are used interchangeably without respect to the specific structure or environment, i.e. one skilled in the art understands the use and meaning.

In the Figures arrows have been used to denote flow and/or connections. The distinction should be noted however that one use for the arrows does not preclude or dictate the other. That is, the use of arrows is to assist in the understanding of possible embodiments of the invention. For example, in FIG. 20, control 2010 has an arrow going from client agent 2006 to connection manager 2014. In this case, as explained, the client agent 2006 "initiates a connection" via control 2010 "to" the connection manger 2014. Thus, the arrow indicates the initial connection. It is to be understood that once a connection is made that information may flow bi-directionally. That is the arrow does not indicate a unidirectional information flow. Information may flow from the client agent 2006 to the connection manager 2014, and from the connection manager 2014 to the client agent 2006.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for a client connection manager have been described.

What is claimed is:

1. A method for connection management in a connection manager, the method comprising:
   receiving connection requests from a plurality of clients at said connection manager;
   establishing a first connection with each of said plurality of clients and said connection manager based upon each connection request from said plurality of clients;
   establishing a second connection with a specific server and said connection manager based upon said received connection request from each of said plurality of clients;
   creating a connection between said first connection of a specific client with said second connection of said specific server such that said connection is transparent to both said specific client and said specific server; and
   disconnecting said specific client from said specific server when said connection is not needed; and said connection manager tearing down said second connection with said specific server.

2. An apparatus comprising:
   means for receiving connection requests from a plurality of clients at a connection manager;
   means for establishing a first connection with each of said plurality of clients and said connection manager based upon each connection request from said plurality of clients;
   means for establishing a second connection with a specific server and said connection manager based upon said received connection request from each of said plurality of clients;
   means for creating a connection between said first connection of a specific client with said second connection of said specific server such that said connection is transparent to both said specific client and said specific server; and
   means for disconnecting said specific client from said specific server when said connection is not needed, and said connection manager tearing down said second connection with said specific server.

* * * * *